United States Patent [19]
Ottersten et al.

[11] Patent Number: 5,828,658
[45] Date of Patent: Oct. 27, 1998

[54] SPECTRALLY EFFICIENT HIGH CAPACITY WIRELESS COMMUNICATION SYSTEMS WITH SPATIO-TEMPORAL PROCESSING

[75] Inventors: Björn E. Ottersten, Lidingö, Sweden; Craig H. Barratt, Redwood City, Calif.; David M. Parish, Amherst, N.Y.; Richard H. Roy, III, Mountain View, Calif.

[73] Assignee: Arraycomm, Inc., San Jose, Calif.

[21] Appl. No.: 735,520

[22] Filed: Oct. 23, 1996

Related U.S. Application Data

[63] Continuation-in-part of Ser. No. 375,848, Jan. 20, 1995, Pat. No. 5,592,490, which is a continuation-in-part of Ser. No. 806,695, Dec. 12, 1991, Pat. No. 5,515,378, and Ser. No. 234,747, Apr. 28, 1994, Pat. No. 5,546,090.

[51] Int. Cl.$^6$ ........................................ H04Q 7/00
[52] U.S. Cl. ........................................ 370/310; 370/329
[58] Field of Search ........................... 370/277, 310, 370/334, 347, 328, 329, 546; 375/200; 342/386, 417, 443, 444; 364/572, 578, 581; 455/525, 450; 702/179

[56] References Cited

U.S. PATENT DOCUMENTS

| | | | |
|---|---|---|---|
| 5,103,459 | 4/1992 | Gilhousen et al. | 375/200 |
| 5,255,210 | 10/1993 | Gardner et al. | 364/574 |
| 5,260,968 | 11/1993 | Gardner et al. | 375/200 |
| 5,262,789 | 11/1993 | Silverstein | 342/368 |
| 5,515,378 | 5/1996 | Roy, III et al. | 370/334 |
| 5,546,090 | 8/1996 | Roy, III et al. | 342/174 |
| 5,592,490 | 1/1997 | Barratt et al. | 370/310 |

*Primary Examiner*—Chau Nguyen
*Attorney, Agent, or Firm*—Henry K. Woodward; Townsend and Townsend and Crew LLP

[57] ABSTRACT

A wireless system includes a network of base stations for receiving uplink signals transmitted from a plurality of remote terminals and for transmitting downlink signals to said plurality of remote terminals using a plurality of channels. A plurality of antenna elements at each base station receives uplink signals, and a plurality of antenna elements at each base station for transmits downlink signals. A signal processor at each base station is connected to the receiving antenna elements and to the transmitting antenna elements for determining spatio-temporal signatures. Spatio-temporal multiplexing and demultiplexing functions are provided for each remote terminal antennae for each channel, and a multiple base station network controller optimizies network performance, whereby communication between the base stations and the plurality of remote terminals in each of the channels can occur simultaneously.

80 Claims, 11 Drawing Sheets

SPECTRALLY EFFICIENT HIGH CAPACITY WIRELESS COMMUNICATION SYSTEMS WITH SPATIO-TEMPORAL PROCESSING

CROSS REFERENCE TO RELATED APPLICATIONS

This application is a continuation-in-part of U.S. patent application Ser. No. 08/375,848 filed 20 Jan., 1995 now U.S. Pat. No 5,592,490 issued Jan. 7, 1997 for Spectrally Efficient High Capacity Wireless Communication Systems, which in turn is a continuation-in-part of U.S. patent application Ser. No. 07/806,695 filed 12 Dec., 1991 now U.S. Pat. No. 5,515,378 issued May 7, 1996 for Spatial Division Multiple Access Wireless Communication Systems and Ser. No. 08/234,747 filed 28 Apr., 1994 now U.S. Pat. No. 5,546,090 issued Aug. 13, 1996 for Method and Apparatus for Calibrating Antenna Arrays.

BACKGROUND OF THE INVENTION

This invention relates to wireless communication systems and, more particularly, to using antenna arrays and signal processing to dramatically increase the capacity and performance of wireless communication systems.

Wireless communication systems can be used to complement and in some instances replace conventional wired communication systems in areas where conventional wireline systems are unavailable, unreliable, or excessively expensive. Examples of such areas are: rural areas with a small number of widespread users, underdeveloped areas with little or no current infrastructure, reliability sensitive applications in areas where wired infrastructure is unreliable, and political environments where monopolistic wired service providers maintain artificially high prices. Even in metropolitan areas and highly developed countries, wireless communication systems may be used for low-cost ubiquitous communication, new flexible data services, and emergency communication systems. In general, wireless communication systems may be used for voice communications just like conventional telephone systems, and for data communications in a radio-based wide area or local area network as well.

Wireless users access wireless communication systems using remote terminals such as cellular telephones and data modems equipped with radio transceivers. Such systems (and in particular the remote terminals) have protocols for initiating calls, receiving calls, and general transfer of information. The information transfer can be performed in real-time such as is the case for circuit-switched voice conversations and faxes, or in a store-and-forward manner such as is often the case for electronic mail, paging and other similar message transfer systems.

Wireless communication systems are generally allocated a portion of the radio frequency spectrum for their operation. The allocated portion of the spectrum is divided up into communication channels. These channels may be distinguished by frequency, by time, by code, or by some combination of the above. Each of these communication channels will be referred to herein as a channel. In conventional communication systems, the channels are designed to be separate or non-overlapping (in time, frequency and/or code) this will be referred to herein as conventional channels. Herein, the channels share a common recourse, they may be non-overlapping, partially overlapping or full overlapping. Depending on the available frequency allocations, the wireless system might have from one to several hundred communication channels. To provide full-duplex communication links, typically some of the communication channels are used for communication from base stations to users' remote terminals (the downlink), and others are used for communication from users' remote terminals to base stations (the uplink).

Wireless communication systems generally have one or more radio base stations, each of which provide coverage to a geographic area known as a cell and often serve as a point-of-presence (PoP) providing connection to a wide area network such as a Public Switched Telephone Network (PSTN). Often a pre-determined subset of the available communication channels is assigned to each radio base station in an attempt to minimize the amount of interference experienced by users of the system. Within its cell, a radio base station can communicate simultaneously with many remote terminals by using different conventional communication channels for each remote terminal.

As aforementioned, base stations can act as PoPs, providing connection to one or more wired communication systems. Such systems include local data networks, wide area data networks, and PSTNs. Thus, remote users are provided access to local and/or wide area data services and the local public telephone system. Base stations can also be used to provide local connectivity without direct access to a wired network such as in local area emergency and mobile battlefield communication systems. Base stations can provide connectivity of various kinds as well. In the aforementioned examples, point-to-point communications where roughly equal amounts of information flow in both directions between two users were assumed. In other applications such as interactive television, information is broadcast to all users simultaneously, and responses from many of the remote units are to be processed at the base stations.

However, conventional wireless communications systems are comparatively spectrally inefficient. In conventional wireless communication systems, only one remote terminal can use any one conventional channel within a cell at any one time. If more than one remote terminal in a cell attempts to use the same channel at the same time, the downlink and uplink signals associated with the remote terminals interfere with each other. Since conventional receiver technology can not eliminate the interference in these combined uplink and downlink signals, remote terminals are unable to communicate effectively with the base station when interference is present. Thus, the total capacity of the system is limited by the number of conventional channels the base station has available, and in the overall system, by the way in which these channels are re-used among multiple cells. Consequently, conventional wireless systems are unable to provide capacity anywhere near that of wired communication systems.

In the co-pending parent U.S. patent application Ser. No. 08/375,848 entitled "Spectrally Efficient High Capacity Wireless Communication Systems", filed 20 Jan., 1995, we have previously disclosed using antenna arrays and signal processing to separate combinations of received (uplink) signals. We also disclosed using transmit spatially multiplexed downlink signals. The result is an increase in spectral efficiency, capacity, signal quality, and coverage of wireless communication systems. Capacity is increased by allowing multiple users to simultaneously share the same communication channel within a cell without interfering with one another, and further by allowing more frequent reuse of the same channel within a geographic area covering many cells. Signal quality and coverage area are improved through appropriate processing of signals received from and transmitted by multiple antenna elements. Moreover, a goal of invention described in the parent application Ser. No. 08/375,848 and herein is to provide capacity gains by dynamically allocating channels among base stations and remote terminals.

Briefly, the invention of the parent application Ser. No. 08/375,848 comprises antenna arrays and signal processing means for measuring, calculating, storing, and using spatial signatures of receivers and transmitters in wireless communication systems to increase system capacity, signal quality, and coverage, and to reduce overall system cost. The antenna array and signal processing means can be employed at base stations (PoPs) and remote terminals. Generally there can be different processing requirements at base stations where many signals are being concentrated than at remote terminals where in general only a limited number of communication links are being managed.

As an example, in a wireless local loop application, a particular base station might serve as a PoP for many remote terminals and employ the antenna array and signal processing described herein. Additionally, remote terminals could employ antenna arrays and signal processing to further improve their capacity and signal quality over simpler remote terminals that handle fewer communication links. Herein, the distinction between base stations and remote terminals is that base stations generally act as concentrators connecting to multiple remote units simultaneously, possibly providing a high capacity connection to a wide area network. While for the sake of clarity much of the ensuing discussion is couched in terms of simple remote terminals that do not employ antenna arrays, nothing herein should be interpreted as preventing such an application. Thus, while hereafter spatial signatures will be associated primarily with remote terminals, when antenna arrays are employed at remote terminals, base stations will have associated spatial signatures as well.

Briefly, as described in the parent application Ser. No. 08/375,848, there are two spatial signatures associated with each remote terminal/base station pair on a particular frequency channel, where for the purpose of this discussion it is assumed that only base stations have antenna arrays. Base stations associate with each remote terminal in their cell a spatial signature related to how that remote terminal receives signals transmitted to it by the base station's antenna array, and a second spatial signature related to how the base station's receive antenna array receives signals transmitted by the remote terminal. In a system with many channels, each remote terminal/base station pair has transmit and receive spatial signatures for each channel.

The receive spatial signature characterizes how the base station antenna array receives signals from the particular remote unit in a particular channel. In one embodiment, it is a complex vector containing responses (amplitude and phase with respect to a reference) of each the antenna element receivers., i.e., for an m-element array, $$h_r = [h_r^1, h_r^2, \ldots, h_r^m]^T, \quad (1)$$

where $h_r^i$ is the response of the $i^{th}$ receiver to a unit power transmitted signal from the remote terminal. Assuming that a narrowband signal $s_r(t)$ is transmitted from the remote terminal, the base station receiver outputs at time t are then given by $$x_r(t) = h_r s_r(t-\tau) + n_r(t), \quad (2)$$

where $\tau$ accounts for the mean propagation delay between the remote terminal and the base station antenna array, and $n_r(t)$ represents noise present in the environment and the receivers.

In the parent application Ser. No. 08/375,848, the transmit spatial signature characterizes how the remote terminal receives signals from each of the antenna array elements at the base station in a particular channel. In one embodiment, it is a complex vector containing relative amounts (amplitude and phase with respect to a reference) of each the antenna element transmitter outputs that are contained in the remote terminal receiver output, i.e., for an m-element array, $$h_t = [h_t^1, h_t^2, \ldots, h_t^m]^T, \quad (3)$$

where $h_t^i$ is the amplitude and phase (with respect to some fixed reference) of the remote terminal receiver output for a unit power signal transmitted from the $i^{th}$ element in the base station array. Assuming that a vector of complex signals $s_t(t) = [s_{t1}(t), \ldots, s_{tm}(t)]^T$ were transmitted from the antenna array, the output of the remote terminal receiver would be given by $$z_t(t) = h_t^T s_t(t-\tau) + n_t(t), \quad (4)$$

where $n_t(t)$ represents noise present in the environment and the receiver. These spatial signatures are calculated (estimated) and stored at each base station for each remote terminal in its cell and for each channel. For fixed remote terminals and base stations in stationary environments, the spatial signatures can be updated infrequently. In general, however, changes in the RF propagation environment between the base station and the remote terminal can alter the signatures and require that they be updated. Note that henceforth, the time argument in parentheses will be suppressed; integers inside parentheses will be used solely for indexing into vectors and matrices.

In the previous discussion, temporally matched receivers and transmitters were assumed. If there are differences in the temporal responses, these can be equalized using temporal filtering techniques as is well-known. Furthermore, the channel bandwidths were assumed to be small compared to the center frequency of operation. Large bandwidth channels may require more than one complex vector to accurately describe the outputs as is well known.

In the parent application Ser. No. 08/375,848, when more than one remote terminal wants to communicate at the same time, the signal processing means at the base station uses the spatial signatures of the remote terminals to determine if subsets of them can communicate with the base station simultaneously by sharing a channel. In a system with m receive and m transmit antenna elements, up to m remote terminals can share the same channel at the same time.

When multiple remote terminals are sharing a single uplink channel, the multiple antenna elements at the base station each measure a combination of the arriving uplink signals and noise. These combinations result from the relative locations of the antenna elements, the locations of the remote terminals, and the RF propagation environment. The signal processing means calculates spatial demultiplexing weights to allow the uplink signals to be separated from the combinations of uplink signals measured by the multiple antenna elements.

In applications where different downlink signals are to be sent from the base station to the remote terminals, the signal processing means computes spatial multiplexing weights that are used to produce multiplexed downlink signals, which when transmitted from the antenna elements at the base station result in the correct downlink signal being received at each remote terminal with appropriate signal quality.

In applications where the same signal is to he transmitted from the base station to a large number (more than the number of antenna elements) of remote terminals, the signal processing means computes weights appropriate for broadcasting the signal, covering the area necessary to reach all the remote terminals.

Therefore, in the parent application Ser. No. 08/375,848, the signal processing means facilitates simultaneous communication between a base station and multiple remote terminals on the same channel. The channel may be a frequency channel. a time slot in a time division multiplexed system, a code in a code division multiplexed system, or any combination of the above. In one embodiment, all elements of a single antenna array transmit and receive radio frequency signals, while in another embodiment the antenna array includes separate transmit antenna elements and receive antenna elements. The number of transmit and receive elements need not be the same.

When there are wideband channels and/or when there is significant delay spread or scattering, it is well known to use time equalization, and in the parent application Ser. No. 08/375,848, it is assumed that such time equalization, if required, is carried out after spatial demultiplexing. Channelization in FDMA (or CDMA) systems is the filtering to separate out the frequency (or code) channels, and is carried out before spatial processing. So decoupling the the spatial processing from the temporal processing such as equalization and channelization is most likely not optimal, and there may be performance advantages to combining the spatial and temporal processing. Thus there is a need in the art for methods and apparatus to define spatial and temporal processing together as a single spatio-temporal processing step, and for methods and apparatus for carrying out such spatio-temporal processing.

SUMMARY OF THE INVENTION

Accordingly, an object of the present invention is to use antenna arrays and signal processing to separate combinations of received (uplink) signals using spatio-temporal signal processing. Another object of the present invention is to transmit spatially multiplexed downlink signals, the spatially multiplexed downlink signals determined by spatio-temporal processing.

Briefly, the invention comprises antenna arrays and signal processor for measuring, calculating, storing, and using spatio-temporal signatures of receivers and transmitters in wireless communication systems to increase system capacity, signal quality, and coverage, and to reduce overall system cost. The antenna array and signal processor can be used at base stations (Pops) and remote terminals. Generally there can be different processing requirements at base stations where many signals are being concentrated than at remote terminals where in general only a limited number of communication links are being managed.

As an example, in a wireless local loop application, a particular base station might serve as a PoP for many remote terminals and use the antenna array and signal processing described herein. Additionally, remote terminals could use antenna arrays and signal processing to further improve their capacity and signal quality over simpler remote terminals that handle fewer communication links. As the terms are used herein, the distinction between base stations and remote terminals is that base stations generally act as concentrators connecting to multiple remote units simultaneously, possibly providing a high capacity connection to a wide area network. For simplicity, much of the description herein is for a system with simple remote terminals that do not use antenna arrays. However nothing herein should be interpreted as preventing such an application. Thus, while hereafter spatio-temporal signatures will be associated primarily with remote terminals, when antenna arrays are used at remote terminals, base stations will have associated spatio-temporal signatures as well.

The spatio-temporal signatures are calculated (estimated) and stored at each base station for each remote terminal in its cell and for each channel. For fixed remote terminals and base stations in stationary environments, the spatio-temporal signatures can be updated infrequently. In general, however, changes in the RF propagation environment between the base station and the remote terminal can alter the signatures and require that they be updated.

When more than one remote terminal wants to communicate at the same time, the signal processor at the base station uses the spatio-temporal signatures of the remote terminals to determine if subsets of them can communicate with the base station simultaneously by sharing channels.

When multiple remote terminals are using overlapping uplink channels, the multiple antenna elements at the base station each measure a combination of the arriving uplink signals and noise. These combinations result from the relative locations of the antenna elements, the locations of the remote terminals, the frequency characteristics of the receiver and transmitter, the spectral content of the signals, and the RF propagation environment. The signal processor calculates spatio-temporal demultiplexing weights to allow the uplink signals to be separated from the combinations of uplink signals measured by the multiple antenna elements.

In applications where different downlink signals arc to be sent from the base station to the remote terminals, the signal processor computes spatio-temporal multiplexing weights that are used to produce multiplexed downlink signals, which when transmitted from the antenna elements at the base station result in the correct downlink signal being received at each remote terminal with appropriate signal quality.

In applications where the same signal is to be transmitted from the base station to a large number of remote terminals, the signal processor computes spatio-temporal transmit weights appropriate for broadcasting the signal, covering the area necessary to reach all the remote terminals.

Therefore, the signal processor facilitates simultaneous communication between a base station and multiple remote terminals on overlapping channels. The channel may be a frequency channel (frequency division multiple access, FDMA), a time slot in a time division multiplexed system (time division multiple access, TDMA), a code in a code division multiplexed system (code division multiple access, CDMA), or any combination of the above. The channel may also be composed of multiple conventional channels.

In one embodiment, all elements of a single antenna array transmit and receive radio frequency signals, while in another embodiment the antenna array includes separate transmit antenna elements and receive antenna elements. The number of transmit and receive elements need not be the same.

The invention and objects and features thereof will be more readily apparent from the following detailed description together with the figures and appended claims.

Formulation and Notation

There are two spatio-temporal signatures associated with each remote terminal/base station pair on a particular frequency channel, where for the purpose of this discussion it is assumed that only base stations have antenna arrays. Base stations associate with each remote terminal in their cell a transmit spatio-temporal signature related to how that remote terminal receives signals transmitted to it by the base station's antenna array, and a receive spatio-temporal signature related to how the base station's receive antenna array receives signals transmitted by the remote terminal. In a system with many channels, each remote terminal/base station pair has transmit and receive spatio-temporal signatures for each channel.

The receive spatio-temporal signature characterizes how the base station antenna array receives signals from the particular remote unit in a particular channel. In one embodiment, it is a matrix containing impulse responses of the antenna element receivers as described below. Assume that a signal $s_r(t)$ is transmitted from the remote terminal. Let in be the number of antennas and associated receivers at the base station. Then, in one embodiment the m base station receiver outputs, at time t can be expressed as $$x_r(t) = \begin{bmatrix} x_{r1}(t) \\ x_{r2}(t) \\ \cdot \\ \cdot \\ \cdot \\ x_{rm}(t) \end{bmatrix} = h_r s_r^{M_r}(t-\tau) + n_r(t), \quad (5)$$

where $$s_r^{M_r}(t-\tau) = \begin{bmatrix} s_r(t-\tau) \\ s_r(t-T-\tau) \\ \cdot \\ \cdot \\ \cdot \\ s_r(t-(M_r-1)T-\tau) \end{bmatrix}, \quad (6)$$

and $h_r$ is the channel response matrix and is in this embodiment assumed to be accurately characterized by a finite impulse response filter. The mean propagation delay between the remote terminal and the base station antenna array is denoted by $\tau$, T is the sampling time and is in this embodiment assumed to satisfy Nyquist's well known sampling theorem, $M_r$ is the length of the channel response, and $n_r(t)$ represents noise present in the environment and the receivers. The channel response at antenna element receiver i, is given by the row vector $h_r(i)$. The channel response matrix is the collection of the individual channel responses $$h_r = \begin{bmatrix} h_r(1) \\ \cdot \\ \cdot \\ \cdot \\ h_r(m) \end{bmatrix}. \quad (7)$$

If the impulse response of the communication channel, antenna elements, receiver and transmitter filters is of length $M_r$, then the impulse response is equal to the channel response matrix, $h_r$. If the impulse response is of longer duration, the channel response matrix, $h_r$, is an approximation of the impulse response and the resulting error is then incorporated in the noise term $n_r(t)$. In one embodiment, the time-delayed receiver outputs, here termed the spatio-temporal receive vector, $z_r(t)$, is modeled by $$z_r(t) = \begin{bmatrix} x_r(t) \\ x_r(t-T) \\ \cdot \\ \cdot \\ \cdot \\ x_r(t-T(L_r-1)) \end{bmatrix} = H_r s_r^{M_r+L_r-1}(t-\tau) + e_r(t). \quad (8)$$

where $L_r$ is the length of a sliding window $$H_r = \begin{bmatrix} h_r & 0 & \ldots & 0 \\ 0 & h_r & \ldots & 0 \\ 0 & \cdot & \cdot & \\ 0 & \cdot & \cdot & 0 \\ 0 & \ldots & 0 & h_r \end{bmatrix} \quad e_r(t) = \begin{bmatrix} n_r(t) \\ n_r(t-T) \\ \cdot \\ \cdot \\ \cdot \\ n_r(t-T(L_r-1)) \end{bmatrix}. \quad (9)$$

The $mL_r$ by $(M_r+L_r-1)$ matrix $H_r$ is called the receive spatio-temporal signature for the remote terminal transmitting $s_r(t)$ at the base station receiving $z_r(t)$ on a particular channel.

When a plurality of remote terminals are active on the same channel, the individual receive spatio-temporal signatures are collected in the demultiplexing spatio-temporal signature matrix, $\mathcal{H}_r$. For each channel, $\mathcal{H}_r$, is formed from the individual spatio-temporal receive signatures $$\mathcal{H}_r = [H_r^1, H_r^2, \ldots, H_r^{n_r}], \quad (10)$$

where $H_r^i$ is the receive spatio-temporal signature, as shown in equation (9), for $i^{th}$ remote terminal currently active on the channel and $n_r$ is the total number of remote terminals on the channel.

Note that when the channel response length is one, $M_r=1$, and the sliding window length is also one, $L_r=1$, this spatio-temporal signature corresponds to the spatial signature as described in our co-pending U.S. patent application Ser. No. 08/375,848 entitled "Spectrally Efficient High Capacity Wireless Communication Systems", filed 20 Jan., 1995. For this case, the channel response matrix, $h_r$, is a column vector and the receive vector has the form $$z_r(t) = h_r s_r(t-\tau) + n_r(t). \quad (11)$$

This is an appropriate model for narrow band communication signals in a propagation environment with limited time-delay spread. For this case, spatial processing may be used in designing a high capacity wireless communication system as described in our co-pending U.S. patent application Ser. No. 08/375,848 entitled "Spectrally Efficient High Capacity Wireless Communication Systems", filed 20 Jan., 1995.

Another special case of the model above is obtain by letting the number of antennas be equal to one, m=1, and letting the sliding window length also be one, $L_r=1$. The single receiver output is then given by $$z_r(t) = h_r(1) s_r^{M_r}(t-\tau) + n_r(t). \quad (12)$$

This model corresponds to the often used discrete time representation of a time dispersive communication channel. The channel is modeled by a finite impulse response filter of length $M_r$. For this case, temporal processing may be applied to counter act the effects of the communication channel. How to apply such temporal processing for the single antenna case is well known in the art.

The model presented in (8) incorporates both the spatial and the temporal dimensions of a communication channel.

Consider now the communication channel from the base station to the remote terminal. The transmit spatio-temporal signature characterizes how the remote terminal receives signals from each of the antenna array elements at the base station in a particular channel. In one embodiment, it is a complex matrix containing the impulse responses from the antenna element transmitter outputs to the remote terminal receiver output as will be described below.

Let the matrix $h_t$ be the channel response matrix from the base station transmitters to the remote terminal. The $i^{th}$ row of the matrix $h_t$ is the channel response from transmitter i, to the remote terminal. The maximum length of the channel responses is $M_t$. If the impulse response of the communication channel, antenna element, transmit and receive filters is of length $M_t$, then the impulse response of the channel is equal to the channel response. If the impulse response is of longer duration, the channel response is an approximation of the impulse response matrix. Let $s_{ti}(t)$ be the complex signal transmitted from the $i^{th}$ base station antenna and let $$s_t(t) = \begin{bmatrix} s_{t1}(t) \\ s_{t2}(t) \\ \vdots \\ s_{tm}(t) \end{bmatrix} \quad (13)$$

The remote terminal receiver output, $z_t(t)$, is now given by $$z_t(t) = [h_t^T(1) \ldots h_t^T(M_t)]s_t^{M_t}(t-\tau) + n_t(t) \quad (14)$$

where $$s_t^{M_t}(t) = \begin{bmatrix} s_t(t) \\ s_t(t-T) \\ \vdots \\ s_t(t-(M_t-1)T) \end{bmatrix} \quad h_t = [h_t(1), h_t(2), \ldots, h_t(M_t)], \quad (15)$$

when the signals $s_t(t)$ are transmitted from the base station antenna array. The term $n_t(t)$ represents noise and interference present in the environment and the receiver and model errors.

Consider now the case when the signal $s_t(t)$ at the base station is constructed from a scalar signal, d(t), $$s_t(t) = \overline{W}_{tx}^* d^{L_t}(t) \quad (16)$$

where $\overline{W}_{tx}$ is the $L_t \times m$ in mutiplexing weight matrix composed of complex scalars, $(\cdot)^*$ is the complex conjugate transpose of a matrix, and $$d^{L_t}(t) = \begin{bmatrix} d(t) \\ \vdots \\ d(t-(L_t-1)T) \end{bmatrix}. \quad (17)$$

The following relation then holds $$s_t^{M_t}(t) = \begin{bmatrix} s(t) \\ \vdots \\ s(t-(M_t-1)T) \end{bmatrix} = \quad (18)$$

$$\begin{bmatrix} \overline{W}_{tx}^* & 0 & \ldots & 0 \\ 0 & \overline{W}_{tx}^* & \ldots & 0 \\ 0 & \cdot & \cdot & 0 \\ 0 & \ldots & 0 & \overline{W}_{tx}^* \end{bmatrix} \begin{bmatrix} d(t) \\ \vdots \\ d(t-(M_t+L_t-2)T) \end{bmatrix}$$

Use equation (18) above in equation (14) to express the signal received at the terminal $z_t(t)$ in terms of the signal d(t) sent from the base station $$z_t(t) = \quad (19)$$

$$[h_t^T(1) \ldots h_t^T(M_t)] \begin{bmatrix} \overline{W}_{tx}^* & 0 & \ldots & 0 \\ 0 & \overline{W}_{tx}^* & \ldots & 0 \\ 0 & \cdot & \cdot & 0 \\ 0 & \ldots & 0 & \overline{W}_{tx}^* \end{bmatrix} d^{M_t+L_t-1}(t-\tau) +$$

$$n_t(t).$$

It is straight forward to rewrite equation (19) into the following form $$z_t(t) = w_{tx}^* H_t d^{M_t+L_t-1}(t-\tau) + n_t(t) \quad (20)$$

where $$w_{tx} = \begin{bmatrix} w_{tx}^T(1) \\ \vdots \\ w_{tx}^T(L_t) \end{bmatrix} \text{ is } (mL_t \times 1), \overline{W}_{tx} = \begin{bmatrix} w_{tx}(1) \\ \vdots \\ w_{tx}(L_t) \end{bmatrix} \text{ is } (L_t \times m), \quad (21)$$

and $$H_t = \begin{bmatrix} h_t & 0 & \ldots & 0 \\ 0 & h_t & \ldots & 0 \\ 0 & \cdot & \cdot & 0 \\ 0 & \ldots & 0 & h_t \end{bmatrix} \quad (22)$$

The transmit spatio-temporal signature, $H_t$, is an $mL_t \times (M_t+L_t-1)$ matrix that describes the relation between the spatio-temporal transmit vector, $d^{M_t+L_t-1}(t)$, and the received signal, $z_t(t)$, at the remote terminal.

When a plurality of remote terminals are active on the same channel, the individual transmit spatio-temporal signatures are collection in the multiplexing spatio-temporal signature matrix, $\mathcal{H}_t$. For each channel, $\mathcal{H}_t$, is formed using the transmit spatio-temporal signatures:

$$\mathcal{H}_t = [H_t^1, H_t^2, \ldots, H_t^{n_t}], \quad (23)$$

where $H_t^i$ is the transmit spatio-temporal signature, as shown in equation (22), for the $i^{th}$ remote terminal currently active on the channel and $n_t$ is the total number of remote terminals on the channel.

Note that henceforth, the sampling time T is assumed to be unity without loss of generality.

Figure 1:
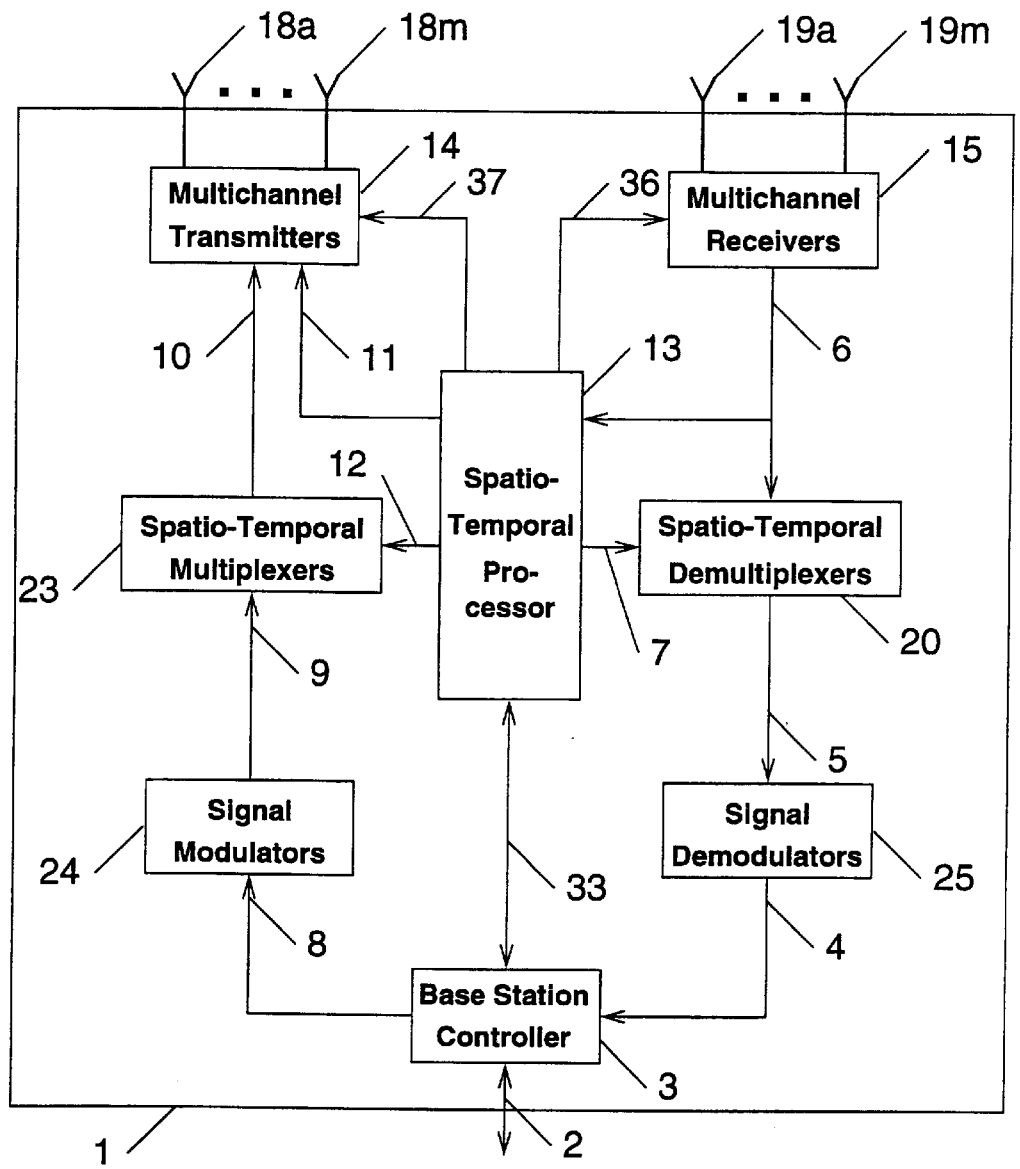
FIG. 1 is a functional block diagram of a base station in accordance with the invention.

LIST OF REFERENCE NUMERALS 1. base station
2. base station communication link
3. base station controller
4. demodulated received signal
5. separated uplink signals
6. received signal measurements
7. demultiplexing weights
8. data to be transmitted directionally
9. modulated signal to be multiplexed for transmission
10. modulated, multiplexed signals to be transmitted
11. base station calibration signals to be transmitted
12. multiplexing weights
13. spatio-temporal processor
14. multichannel transmitters
15. multichannel receivers
16a. multichannel receiver
16m. multichannel receiver
17a. multichannel transmitter
17m. multichannel transmitter
18a. transmit antenna
18m. transmit antenna
19a. receive antenna
19m. receive antenna
20. spatio-temporal demultiplexer
21. adder
22a. temporal filter
22i. temporal filter
22m. temporal filter
23. spatio-temporal multiplexer
24. signal modulator
25. signal demodulator
26a. multipliers
26b. multipliers
26L. multipliers
27a. sample delay
27b. sample delay
27L. sample delay
28. adder
29a. temporal filters
29i. temporal filters
29m. temporal filters
30a. multipliers
30b. multipliers
30L. multipliers
31a. sample delay
31b. sample delay
31L. sample delay
32. adder
33. spatio-temporal control data
34. spatio-temporal parameter data
35. common receiver oscillator
36. receiver control data
37. transmitter control data
38. common transmitter oscillator
39. spatio-temporal processor controller
40. active remote terminal list
41. channel selector
42. remote terminal database
43. spatio-temporal weight processor
44. spatio-temporal signature processor
45. remote terminal antenna
46. remote terminal duplexer
47. remote terminal duplexer output
48. remote terminal receiver
49. remote terminal received signal
50. remote terminal received calibration signal
51. remote terminal demodulator
52. remote terminal demodulated data
53. remote terminal keyboard and keyboard controller
54. remote terminal keyboard data
55. remote terminal display data
56. remote terminal display and display controller
57. remote terminal modulator
58. remote terminal data to be transmitted
59. remote terminal modulated data to be transmitted
60. remote terminal transmitter
61. remote terminal transmitter output
62. remote terminal transmitter control data
63. remote terminal receiver control data
64. remote terminal microphone
65. remote terminal microphone signal
66. remote terminal speaker
67. remote terminal speaker signal
68. remote terminal central processing unit
69. remote terminal transponder switch
70. remote terminal transponder switch control
71. wide area network
72. multiple base station controller
73a. cell boundary
73b. cell boundary
73c. cell boundary
74. high speed message link
75. remote terminal

DESCRIPTION OF INVENTION

FIG. 1 depicts the preferred embodiment of a base station 1. A base station controller 3 acts as an interface between base station 1 and any external connection via a base station communication link 2. and serves to coordinate the overall operation of base station 1. In the preferred embodiment, base station controller 3 is implemented with a conventional central processing unit and associated memory and programming.

Incoming or uplink radio transmissions impinge on an antenna array composed of a number m, of receive antenna elements 19($a, \ldots ,m$) each of whose outputs is connected to one of m multichannel receivers in a bank of phase-coherenlt multichannel receivers 15.

The illustrative embodiment describes a conventional frequency division multiple access (FDMA) system. Each multichannel receiver is capable of handling multiple frequency channels. The symbol $N_{cc}$ will be used to reference the maximum number of conventional frequency channels that can be handled by the receivers. Depending on the frequencies allocated for the operation of the wireless communication system and the bandwidths chosen for particular communication links, $N_{cc}$ could be as small as one (a single frequency channel) or as large as thousands. In alternate embodiments, multichannel receivers 15 might instead handle multiple time slots, multiple codes, or some combination of these well known multiple access techniques. In an alternative embodiment, the channels may be composed of multiple conventional channels.

In each channel, receive antenna elements 19($a, \ldots, m$) each measure a combination of the arriving uplink signals from the remote terminals sharing this channel. These combinations result from the relative locations of the antenna elements, the locations of the remote terminals, the frequency characteristics of the receiver and transmitter, the spectral content of the signals, and the RF propagation environment, and are given by equation (5).

Figure 2:
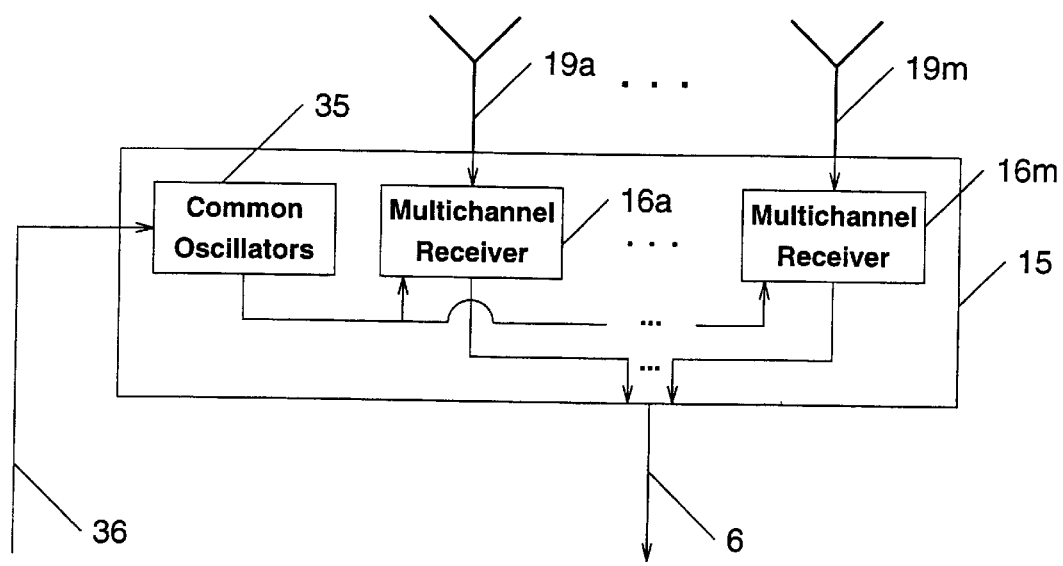
FIG. 2 is a functional block diagram of multichannel receivers in the base station.

FIG. 2 depicts individual multichannel receivers 16($a, \ldots, m$) with antenna element connections, common local receiver oscillators 35, one for each frequency channel to be used at that base station, and received signal measurements 6. Common local receiver oscillators 35 ensure that the signals from receive antenna elements 19($a, \ldots, m$) are coherently down-converted to baseband; its $N_{cc}$ frequencies are set so that multichannel receivers 16($a, \ldots, m$) extract all $N_{cc}$ frequency channels of interest. The frequencies of common local receiver oscillators 35 are controlled by a spatio-temporal processor 13 (FIG. 1) via receiver control data 36. In an alternate embodiment, where multiple frequency channels are all contained in a contiguous frequency band, a common local oscillator is used to down-convert the entire band which is then digitized, and digital filters and decimators extract the desired subset of channels using well known techniques.

The illustrative embodiment describes a FDMA system. In a TDMA or CDMA system, common oscillators 35 would be augmented to relay common time slot or common code signals respectively from spatio-temporal processor 13, via receiver control data 36, to multichannel receivers 16($a, \ldots, m$). In these embodiments, multichannel receivers 16($a, \ldots, m$) perform selection of conventional time division channels or conventional code division channels in addition to down conversion to baseband.

Referring again to FIG. 1, multichannel receivers 15 produce received signal measurements 6 which are supplied to spatio-temporal processor 13 and to a set of spatio-temporal demultiplexers 20. In this embodiment, received signal measurements 6 contain in complex baseband signals for each of $N_{cc}$ frequency channels.

Figure 8:
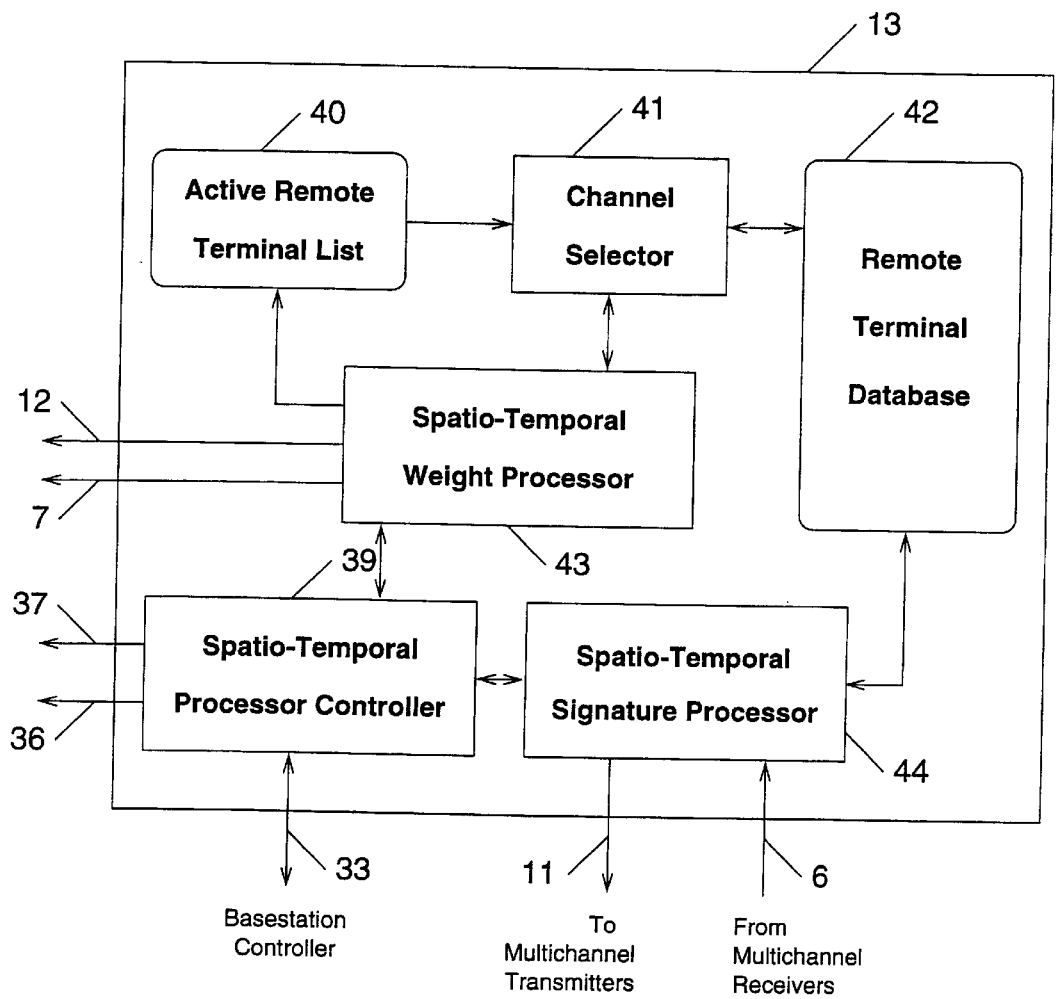
FIG. 8 is a functional block diagram of a spatio-temporal processor in the base station.

FIG. 8 shows a more detailed block diagram of spatio-temporal processor 13. Spatio-temporal processor 13 produces and maintains spatio-temporal signatures for each remote terminal for each frequency channel, and calculates spatio-temporal multiplexing and demultiplexing weights for use by spatio-temporal demultiplexers 20 and spatio-temporal multiplexers 23. In the preferred embodiment, spatio-temporal processor 13 is implemented using a digital signal processor (DSP) device which includes a conventional central processing unit. Received signal measurements 6 go into a spatio-temporal signature processor 44 which estimates and updates spatio-temporal signatures. Spatio-temporal signatures are stored in a spatio-temporal signature list in a remote terminal database 42 and are used by channel selector 41 and spatio-temporal weight processor 43, which also produces demultiplexing weights 7 and multiplexing weights 12. A spatio-temporal processor controller 39 connects to spatio-temporal weight processor 43 and also produces receiver control data 36 transmitter control data 37 and spatio-temporal control data 33.

Figure 3:
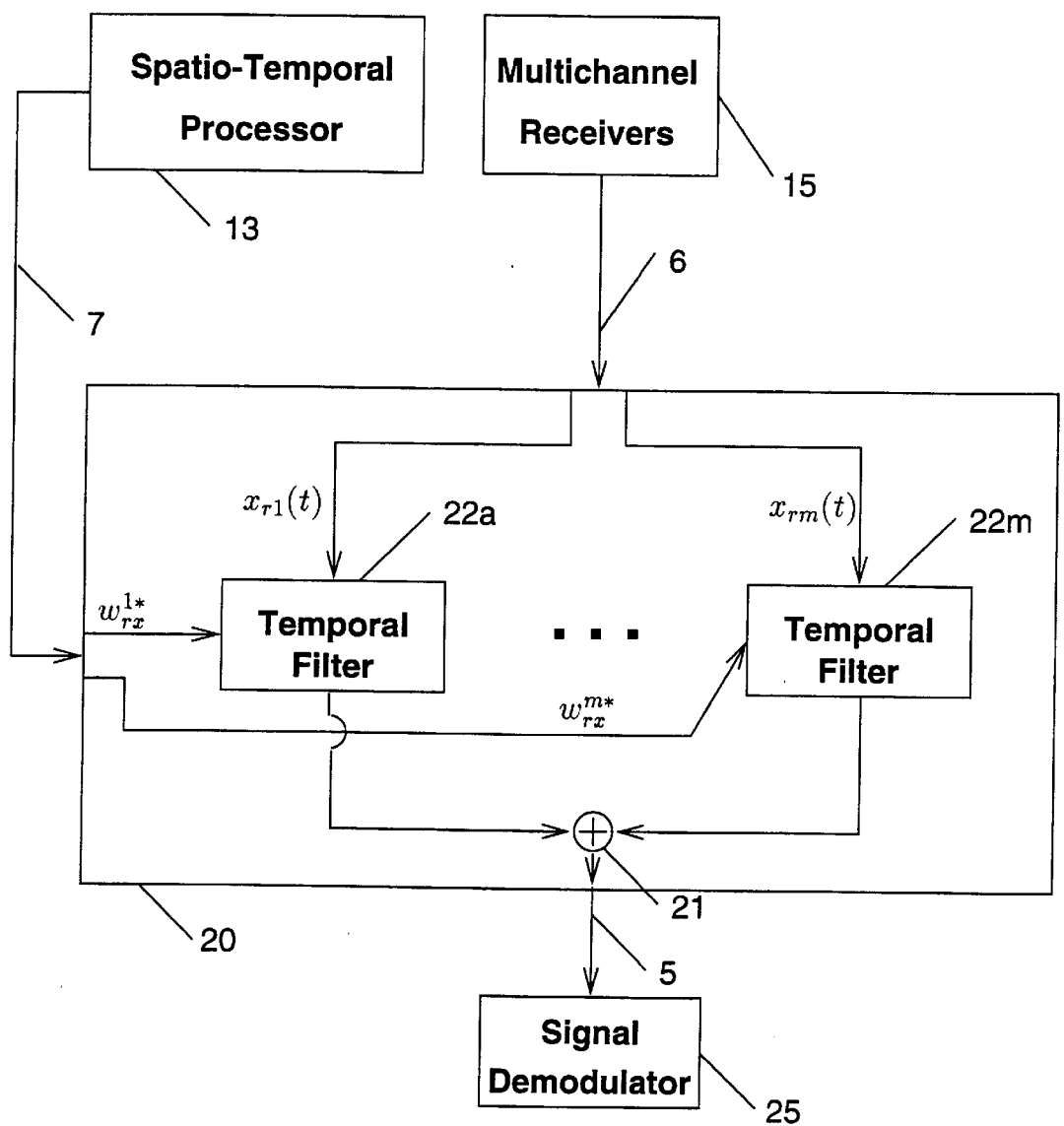
FIG. 3 is a functional block diagram of a spatio-temporal demultiplexer in the base station.

Referring again to FIG. 8, the spatio-temporal demultiplexers 20 combine received signal measurements 6 according to the spatio-temporal demultiplexing weights 7. FIG. 3 shows a spatio-temporal demultiplexer 20 for a single channel. In FIG. 3, $x_{ri}$ denotes the $i^{th}$ component of the receive measurement vector 6 for a single channel, and $w_{rx}^{i*}$ denotes the complex conjugate transpose of the $i^{th}$ column of the demultiplexing weight matrix.

$$\overline{W}_{rx} = [w_{rx}^1, w_{rx}^2, \ldots, w_{rx}^m] = \begin{bmatrix} w_{rx}(1) \\ \cdot \\ \cdot \\ \cdot \\ w_{rx}(L_r) \end{bmatrix} \quad (24)$$

for a remote terminal using this channel.

Figure 4:
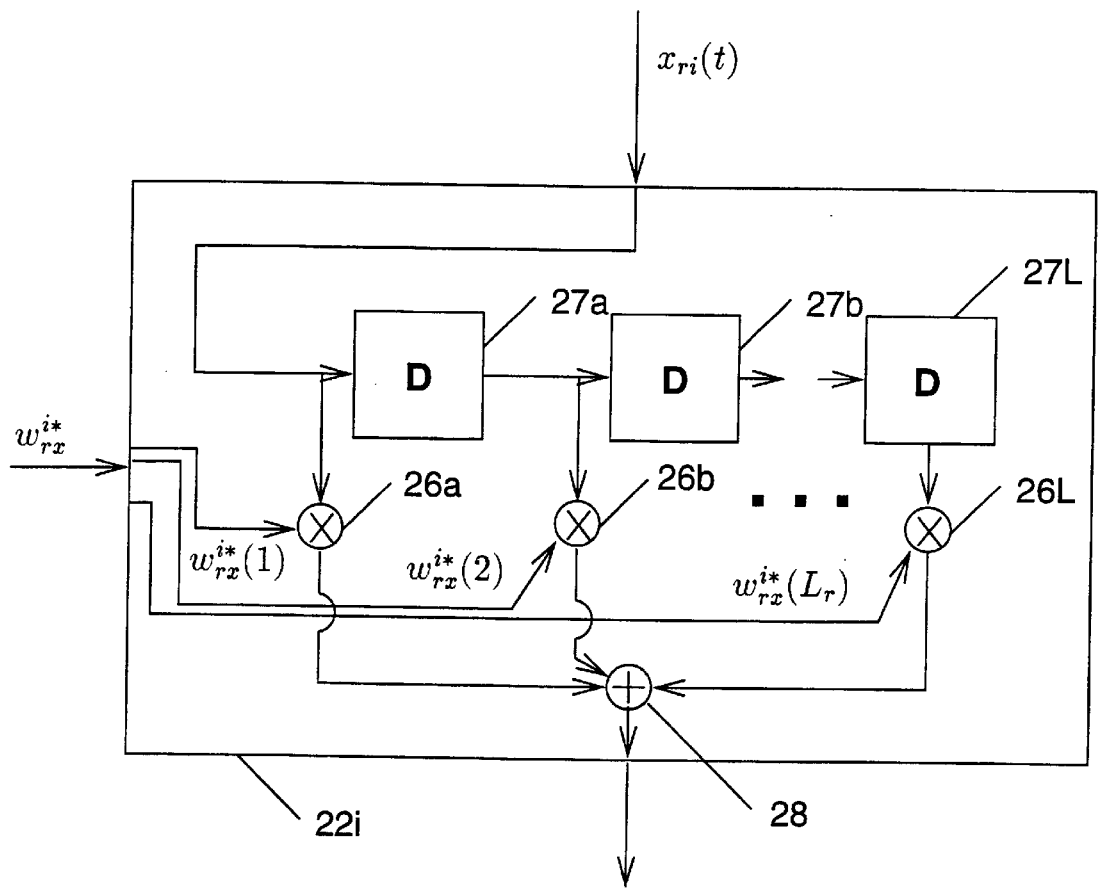
FIG. 4 is a functional block diagram of a temporal filter of the spatio-temporal demultiplexer in the base station.

FIG. 4 illustrates the processing of the $i^{th}$ received signal $x_{ri}$ for a single channel. In this embodiment, arithmetic operations in temporal filters 22($a, \ldots, m$) are carried out using general purpose arithmetic chips. In FIG. 4, $x_{ri}$ denotes the $i^{th}$ component of the receive measurement vector 6 for a single channel, and $w_{rx}^{i*}(j)$ denotes the complex conjugate of the $j^{th}$ component of the $i^{th}$ vector component of the spatio-temporal demultiplexing weight vector 7

$$w_{rx} = \begin{bmatrix} w_{rx}^T(1) \\ \cdot \\ \cdot \\ \cdot \\ w_{rx}^T(L_r) \end{bmatrix} \quad w_{rx}(j) = [w_{rx}^1(j), \ldots, w_{rx}^m(j)] \quad (25)$$

for a remote terminal using this channel.

For each remote terminal on each channel, the $i^{th}$ temporal filter 22$i$ computes $$w_{rx}^{i*}(1)x_{ri}(t)+w_{rx}^{i*}(2)x_{ri}(t-T)+ \ldots +w_{rx}^{i*}(L_r)x_{ri}(t-T(L_r-1)) \quad (26)$$

The multiplication is performed by multipliers 26($a, b, \ldots, L$), and the addition is performed by adder 28. For each remote terminal on each channel, the spatio-temporal demultiplexer 20 adds the outputs of the temporal filters 22($a, \ldots, m$) using adder 21 thus outputing $$W_{rx}^* z_r(t). \quad (27)$$

For each remote terminal on each channel, the output of adder 21 given by equation (27) comprises the separated uplink signals 5.

Referring again to FIG. 1, the outputs of spatio-temporal demultiplexers 20 are the separated uplink signals 5 for each remote terminal communicating with the base station. The separated uplink signals 5 are demodulated by signal demodulators 25, producing demodulated received signals 4 for each remote terminal communicating with the base station. Demodulated received signals 4 and corresponding spatio-temporal control data 33 are available to base station controller 3.

In an alternate embodiment, the demultiplexing and demodulation processing are performed together in a non-linear multidimensional signal processing unit.

In embodiments where channel coding of the signals sent by remote terminals is performed, base station controller 3 sends the demodulated received signals 4 to spatio-temporal processor 13 which, using well known decoding techniques, estimates Bit-Error-Rates (BERs) and compares them against acceptable thresholds stored in the remote terminal database 42. If the BERs are unacceptable, spatio-temporal processor 13 reallocates resources so as to alleviate the problem. In one embodiment, links with unacceptable BERs are assigned to new channels using the same strategy as adding a new user with the exception that the current channel is not acceptable unless the current set of users of that particular channel changes. Additionally, recalibration of the receive signature for that remote terminal/base station pair is performed when that channel is available.

For transmission, signal modulators 24 produce modulated signals 9 for each remote terminal the base station is transmitting to, and a set of spatio-temporal multiplexing weights 12 for each remote terminal are applied to the respective time-delayed versions of the modulated signals in spatio-temporal multiplexers 23 to produce multiplexed signals to be transmitted 10 for each of the m transmit antennas 18(a, . . . ,m) and each of the $N_{cc}$ channels.

In the illustrative embodiment the number $N_{cc}$ of downlink channels is the same as the number $N_{cc}$ of uplink channels. In other embodiments, there may be different numbers of uplink and downlink channels. Furthermore, the channels may be of different types and bandwidths as is the case for an interactive television application where the downlink is comprised of wideband video channels and the uplink employs narrowband audio/data channels.

Additionally, the illustrative embodiment shows the same number of antenna elements, m, for transmit and receive. In other embodiments, the number of transmit antenna elements and the number of receive antenna elements may be different, up to and including the case where transmit employs only one transmit antenna element in an omnidirectional sense such as in an interactive television application.

Figure 5:
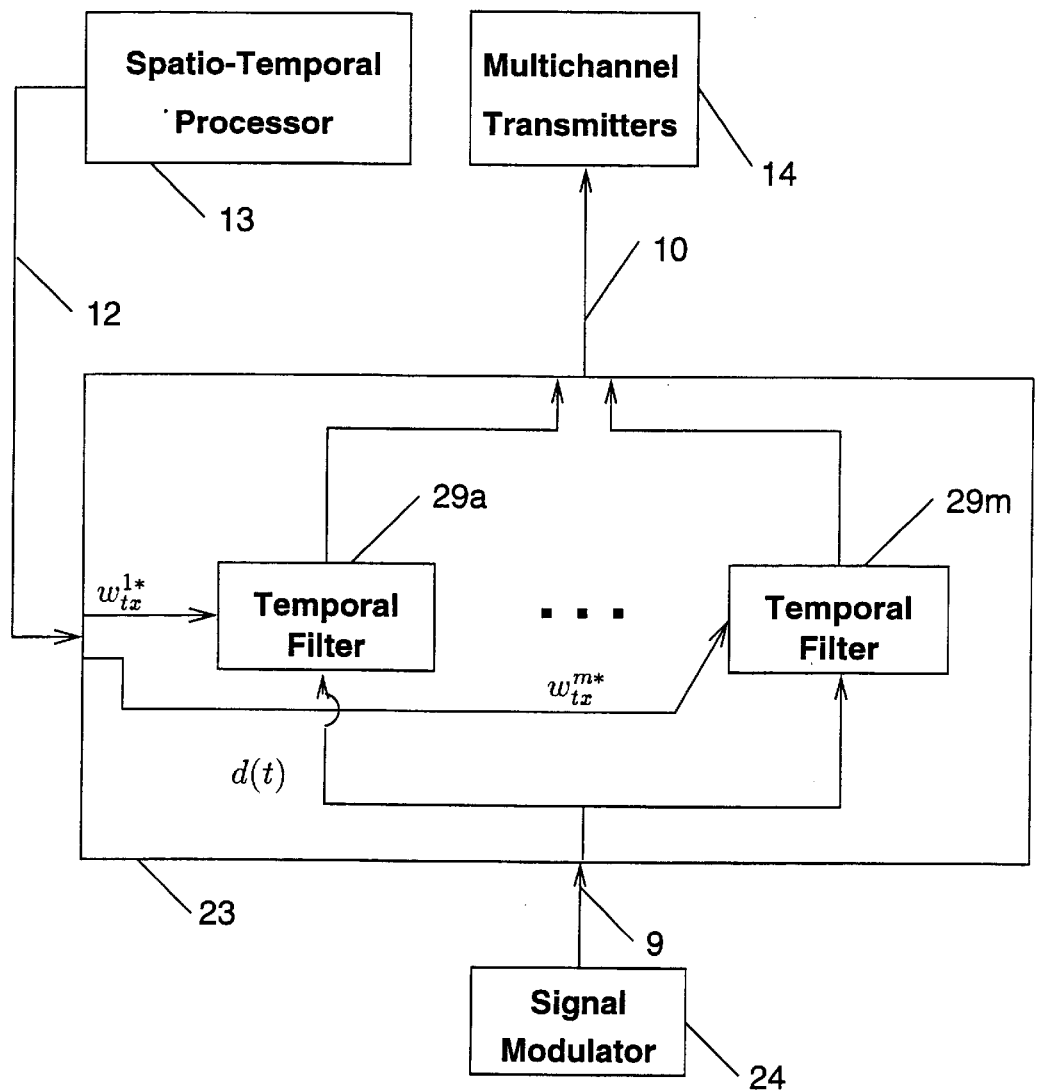
FIG. 5 is a functional block diagram of a spatio-temporal multiplexer in the base station.
Figure 6:
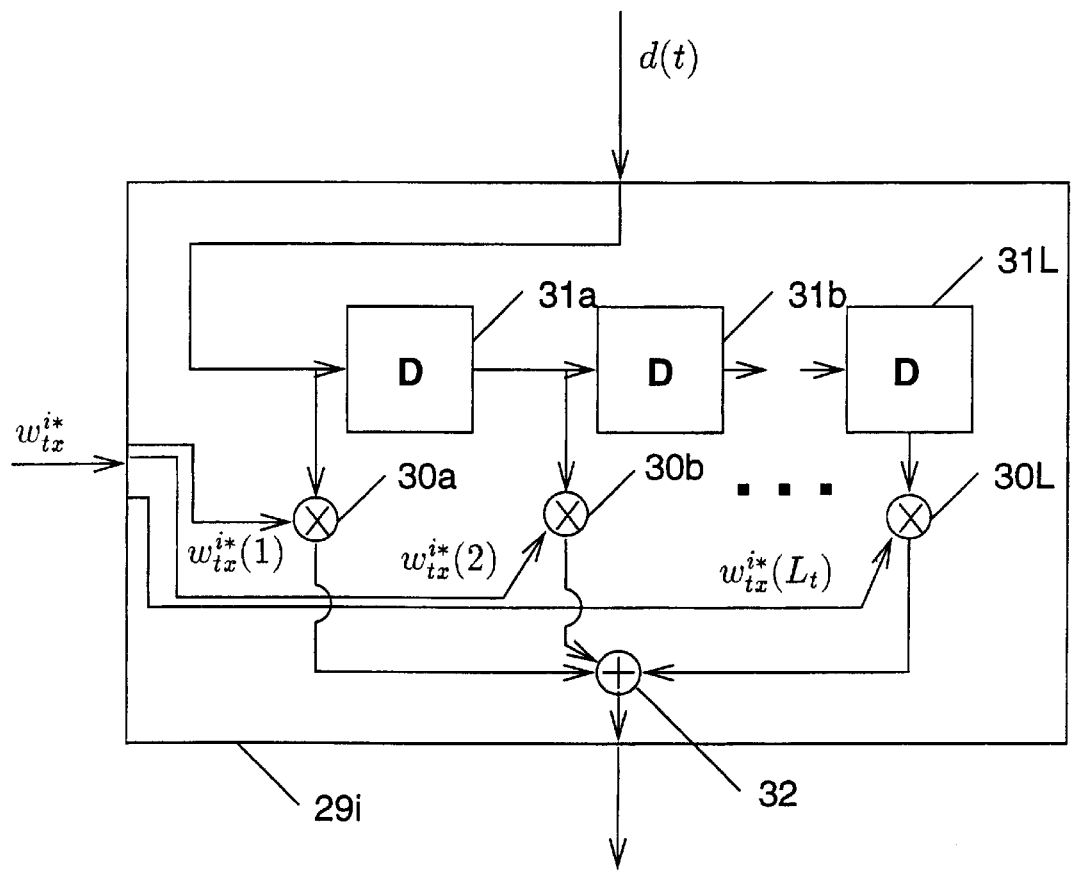
FIG. 6 is a block diagram of a temporal filter.

FIG. 5 shows the spatio-temporal multiplexer for one remote terminal on a particular channel. Arithmetic operations in spatio-temporal multiplexer 23 are carried out using general purpose arithmetic chips. The component of modulated signals 9 destined for this remote terminal on this channel is denoted by d(t) and the multiplexing weight vector is denoted by $w_{tx}$. The multiplexing weight vector, $w_{tx}$, is related to the multiplexing weight matrix, $\overline{W}_{tx}$, through $$w_{tx} = \begin{bmatrix} w_{tx}^T(1) \\ . \\ . \\ . \\ w_{tx}^T(L_t) \end{bmatrix} \text{ is } (mL_t \times 1) \quad \overline{W}_{tx} = \begin{bmatrix} w_{tx}(1) \\ . \\ . \\ . \\ w_{tx}(L_t) \end{bmatrix} \text{ is } (L_t \times m), \quad (28)$$

For each remote terminal on each channel, the spatio-temporal multiplexer 23 computes the product of its multiplexing weight matrix 12 with delayed versions of the modulated signal d(t)9:

$$s_t(t) = \overline{W}_{tx} d^{L_t}(t) = \begin{bmatrix} w_{tx}(1) \\ . \\ . \\ . \\ w_{tx}(L_t) \end{bmatrix}^* \begin{bmatrix} d(t) \\ . \\ . \\ . \\ d(t - (L_t - 1) - T) \end{bmatrix}. \quad (29)$$

The temporal filters 29(a, . . . ,m) compute the products of the rows of the multiplexing weight matrix with delayed versions of the modulated signal d(t)9. For each remote terminal on each channel, the $i^{th}$ temporal filter 29i computes $$w_{tx}{}^{i*}(1)d(t) + w_{tx}{}^{i*}(2)d(t-T) + \ldots + w_{tx}{}^{i*}(L_t) \, d(t-T(L_t-1)) \quad (30)$$

The multiplication is performed by multipliers 30(a,b, . . . ,L), and the addition is performed by adder 32. For each channel, equation (29) is evaluated by the spatio-temporal multiplexer 23 for each remote terminal that is being transmitted to on this channel. Corresponding to each remote terminal is a different multiplexing weight vector, multiplexing weight matrix, and modulated signal. For each channel, spatio-temporal multiplexer 23 adds the multiplexed signals for each remote terminal being transmitted to on this channel, producing modulated and multiplexed signals 10, $s_t(t)$, that are the signals to be transmitted for each downlink channel from each antenna.

Figure 7:
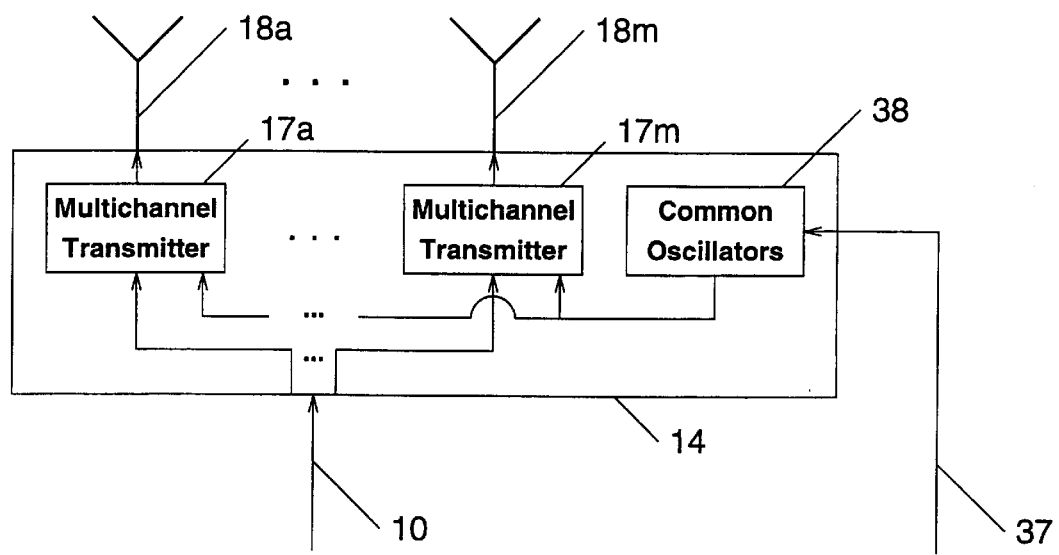
FIG. 7 is a functional block diagram of a multichannel transmitter in the base station.

Modulated and multiplexed signals 10 are inputs to a bank of m phase coherent multichannel transmitters 14. FIG. 7 depicts multichannel transmitters 17(a, . . . ,m) with antenna connections, common local transmitter oscillators 38, and digital inputs 10. Common local transmitter oscillators 38 ensure that the relative phases of multiplexed signals 10 are preserved during transmission by transmit antennas 18(a, . . . ,m). The frequencies of common local transmitter oscillators 38 are controlled by spatio-temporal processor 13 (see FIG. 1) via transmitter control data 37.

In an alternate embodiment, spatio-temporal multiplexer 23 uses well known baseband multiplexing techniques to multiplex all the calculated channel signals to be transmitted into a single wideband signal to be up-converted and transmitted by each of the multichannel transmitters 17(a, . . . ,m). The multiplexing can be performed either digitally or in analog as appropriate.

The illustrative embodiment shows a system with multiple frequency channels. In a time division multiple access or code division multiple access system, common oscillators 38 would be augmented to relay common time slot or common code signals respectively from spatio-temporal processor 13, via transmitter control data 37, to multichannel transmitters 17(a, . . . ,m).

Referring again to FIG. 1, in applications where transmit spatio-temporal signatures are required, spatio-temporal processor 13 is also able to transmit predetermined calibration signals 11 for each antenna on a particular downlink channel. Spatio-temporal processor 13 instructs imultichannel transmitters 17(a, . . . ,m), via transmitter control data 37, to transmit predetermined calibration signals 11 in place of the multiplexed signals 10 for a particular downlink channel. This is one mechanism used for determining the transmit spatio-temporal signatures of the remote terminals on this downlink channel.

In alternate embodiments where well known channel coding techniques are used to encode the signals to be transmitted to remote terminals, remote terminals employ well known decoding techniques to estimate BERs which are then reported back to the base station on their uplink channel. If these BERs exceed acceptable limits, corrective action is taken. In one embodiment, the corrective active involves reallocating resources by using the same strategy as adding a new user with the exception that the current channel is not acceptable unless the current set of users of that particular channel changes. Additionally, recalibration of the transmit signature for that remote terminal/base station pair is performed when that channel is available.

Figure 9:
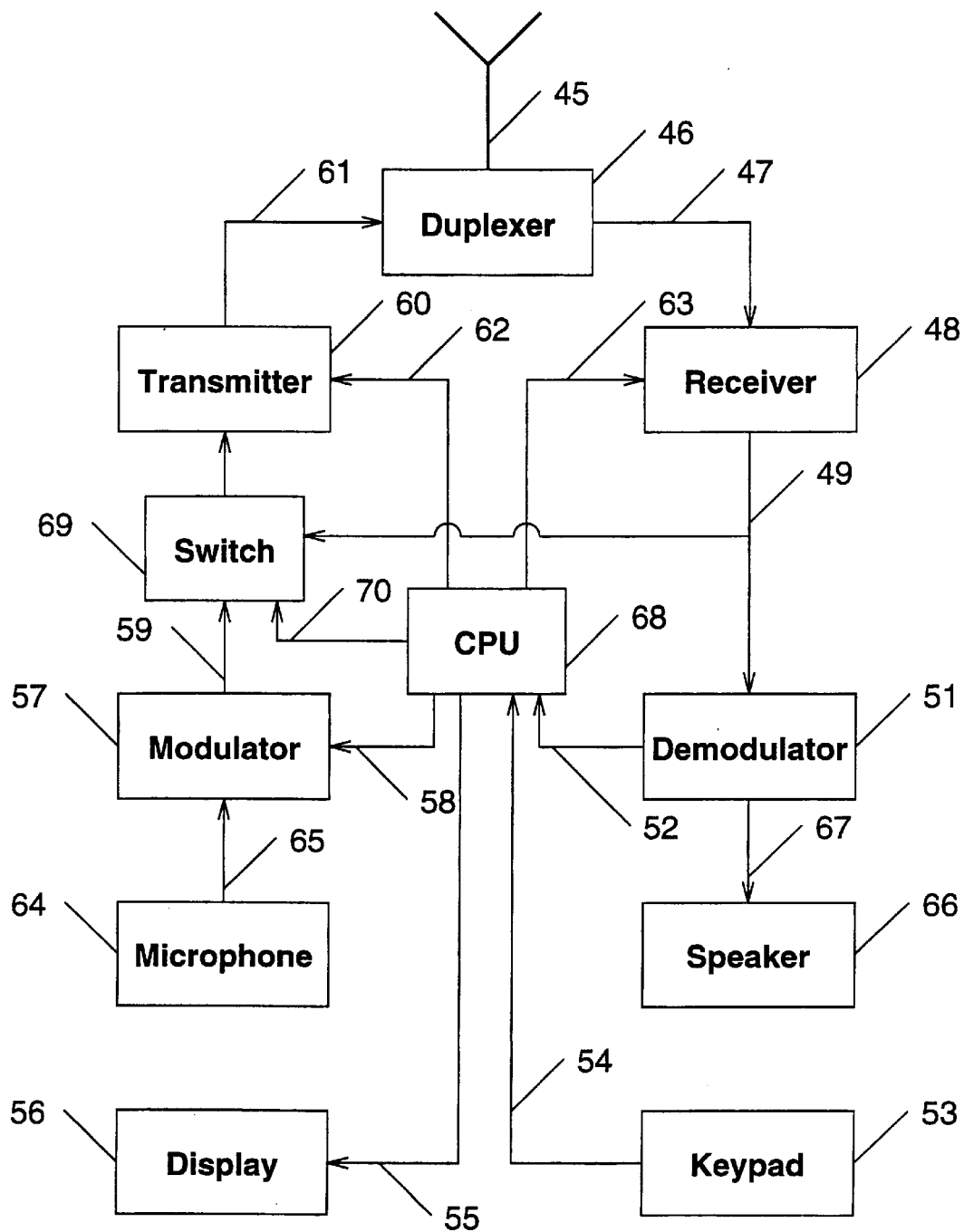
FIG. 9 is a functional block diagram of a remote terminal with a transponder switch.

FIG. 9 depicts the component arrangement in a remote terminal that provides voice communication. The remote termninal's antenna 45 is connected to a duplexer 46 to permit antenna 45 to be used for both transmission and reception. In an alternate embodiment, separate receive and transmit. antennas are used eliminating the need for duplexer 46. In another alternate embodiment where reception and transmission occur on the same frequency channel but at different times, a transmit/receive (TR) switch is used instead of a duplexer as is well known. Duplexer output 47 serves as input to a receiver 48. Receiver 48 produces a down-converted signal 49 which is the input to a demodulator 51. A demodulated received voice signal 67 is input to a speaker 66.

Demodulated received control data 52 is supplied to a remote terminal central processing unit 68 (CPU). Demodulated received control data 52 is used for receiving data from base station 1 during call setup and termination, and in an alternate embodiment, for determining the quality (BER) of the signals being received by the remote terminal for transmission back to the base station as described above. Remote terminal CPU 68 is implemented with a standard DSP device. Remote terminal CPU 68 also produces receiver control data 63 for selecting the remote terminal's reception channel, transmitter control data 62 for setting the remote terminal's transmission channel and power level, control data to be transmitted 58, and display data 55 for remote terminal display 56. Remote terminal CPU 68 also receives keyboard data 54 from remote terminal keyboard 53.

The remote terminal's voice signal to be transmitted 65 from microphone 64 is input to a modulator 57. Control data to be transmitted 58 is supplied by remote terminal CPU 68. Control data to be transmitted 58 is used for transmitting data to base station 1 during call setup and termination as well as for transmitting information during the call such as measures of call quality (e.g., bit error rates (BERs)). The modulated signal to be transmitted 59, output by modulator 57, is up-converted and amplified by a transmitter 60, producing a transmitter output signal 61. Transmitter output 61 is then input to duplexer 46 for transmission by antenna 45.

In an alternate embodiment, the remote terminal provides digital data communication. Demodulated received voice signal 67, speaker 66, microphone 64, and voice signal to be transmitted 65 are replaced by digital interfaces well-known in the art that allow data to be transmitted to and from an external data processing device (for example, a computer).

Referring again to FIG. 9, the remote terminal allows received data 49 to be transmitted back to base station 1 via switch 69 controlled by remote terminal CPU 68 through switch control signal 70. In normal operation, switch 69 drives transmitter 60 with modulated signal 59 of modulator 57. When the remote terminal is instructed by base station 1 to enter calibration mode, the remote terminal CPU 68 send a predetermined calibration signal 58 to the modulator 57 in place of the remote terminal microphone signal 65. This is one mechanism used for determining the receive spatio-temporal signatures of the remote terminals on this uplink channel. In transponder mode, remote terminal (CPU 68 toggles switch control signal 70, which instructs switch 69 to drive transmitter 60 with received data 49.

Figure 10:
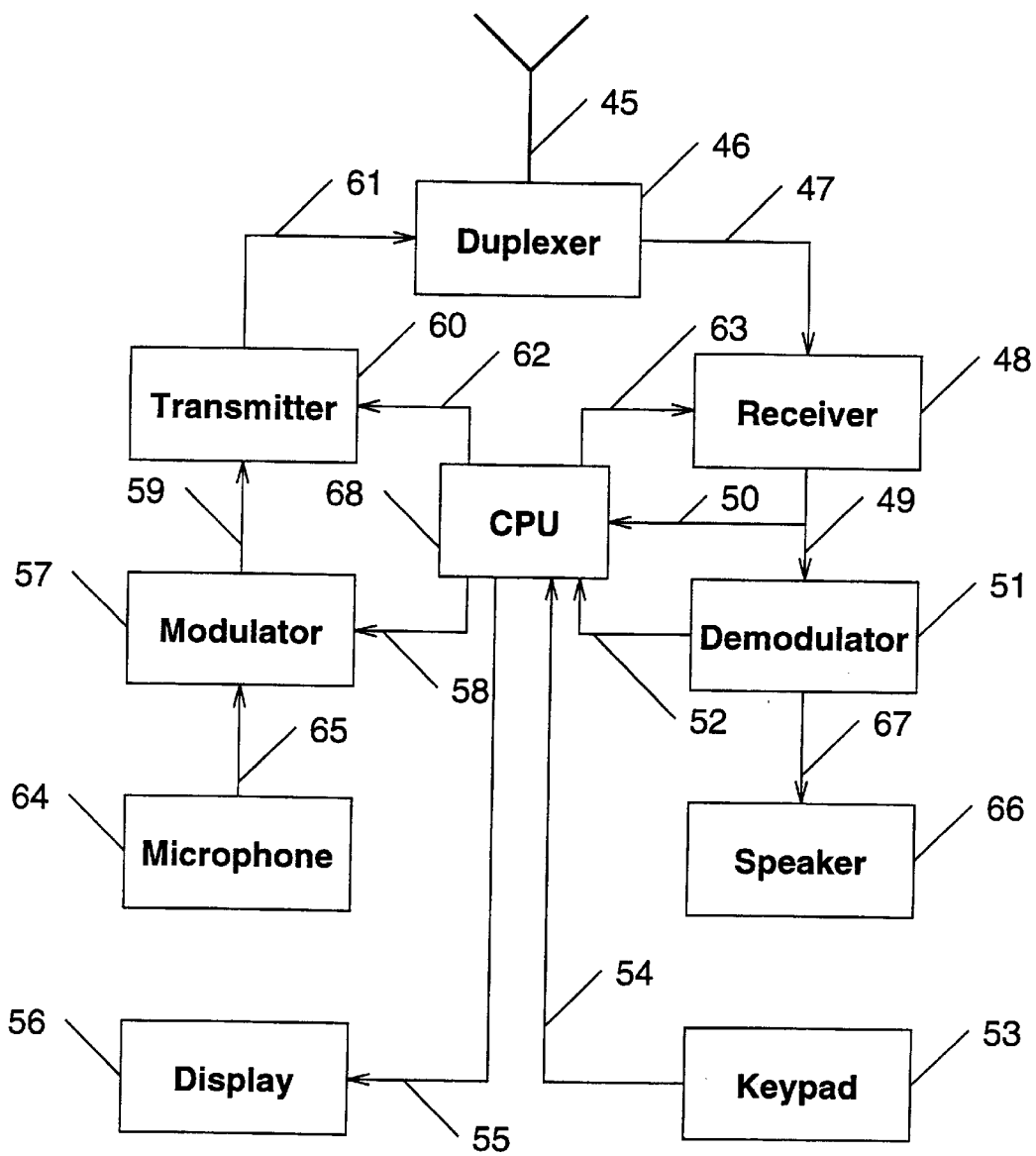
FIG. 10 is a functional block diagram of a remote terminal.

FIG. 10 shows an alternate embodiment of the remote terminal transponder function. Switch 69 of FIG. 9 is no longer used. Instead, the output of receiver 48 is supplied to remote terminal CPU 68 by data connection 50. In normal operation remote terminal CPU 68 ignores data connection 50. In calibration mode, remote terminal CPU 68 uses data connection 50 to compute the remote terminal's transmit spatio-temporal signature, which is transmitted back to base station 1 through modulator 57 and transmitter 60 as control data to be transmitted 58.

In an alternate embodiment, spatio-temporal calibration procedures in the remote terminal are not required. In many conventional wireless protocol standards, remote terminals regularly report received signal strength or receive signal quality back the base station. In this embodiment, the received signal strength reports are sufficient to compute the remote terminal's transmit spatio-temporal signature, as described below.

Operation of Invention
General Principles—Base Station

In many respects, the spectrally efficient base station shown in FIG. 1 behaves much like a standard wireless communication system base station. The primary distinction is that the spectrally efficient base station supports more simultaneous conversations than a conventional base station using the same time/frequency resources. The communication channels may be frequency channels, time channels, code channels, or any combination of these. The spatio-temporal multiplexer/demultiplexer increases the system capacity by allowing multiple simultaneous communication links on each of these channels. Moreover, by combining signals from multiple receive antennas, the spatio-temporal demultiplexer 20 produces separated uplink signals 5 that are equalized in simultaneously spatially and temporally. The separate uplink signals 5 will as a consequence have substantially improved signal-to-noise, reduced interference, and improved quality in multipath environments compared to a standard base station.

In the illustrative embodiment, a wireless communication system comprised of multiple remote terminals and base stations incorporating antenna arrays and spatio-temporal signal processing is described. Such systems have application, for example, in providing wireless access to the local PSTN. Information transfers (or calls) arc initiated by either a remote terminal or by communication link 2 through base station controller 3. Call initialization takes place on a downlink and uplink control channel as is well known in the art. In the present embodiment, the downlink control channel is transmitted using transmission antennas $18(a, \ldots, m)$. In an alternate embodiment, the downlink control channel is broadcast from a single, omnidirectional antenna. Base station controller 3 passes the identification of the remote terminal to be involved in the call to spatio-temporal processor 13 which uses the stored spatio-temporal signatures of that remote terminal to determine which communication channel the remote terminal should use. The selected channel may already be occupied by several remote terminals, however spatio-temporal processor 13 uses the spatio-temporal signatures of all of the remote terminals on that channel to determine that they can share the channel without interference.

Spatio-temporal processor 13 uses calculated spatio-temporal multiplexing and demultiplexing weights for the selected channel and the remote terminal in question to configure spatio-temporal multiplexer 23 and spatio-temporal demultiplexer 20. Spatio-temporal processor 13 then informs controller 3 of the selected channel. As in a conventional base station, controller 3 then commands the remote terminal (via the downlink control channel) to switch to the selected channel for continued communications. In the event that the remote terminal has power control capabilities, as is well known in the art, controller 3 also commands the remote terminal to adjust its power to an appropriate level based on parameters such as the power levels of the other remote terminals sharing the same channel and the required signal quality for each link as discussed below. At the termination of communications, the remote terminal returns to its idle state where it monitors the downlink control channel awaiting its next call.

Temporal and Spatial Processing—Base Station

FIG. 8 shows a block diagram of spatio-temporal processor 13. It is controlled by spatio-temporal processor controller 39, which interfaces to base station controller 3 via link 33. Spatio-temporal processor controller 39 controls the gain and frequency settings of multichannel transmitters 14 and multichannel receivers 15 by control lines 37 and 36.

Spatio-temporal processor 13 maintains an active remote terminal list 40 that catalogs which remote terminals are currently using each communication channel as well as their current transmit power levels. Other parameters of the remote terminals such as modulation formats currently used, receiver noise levels in current frequency channels, and current signal quality requirements are stored as well. Spatio-temporal processor 13 also maintains a spatio-temporal signature list in the remote terminal database 42, which in alternate embodiments includes remote terminals' power control levels, allowed frequency channels for receive and transmit, and list of modulation formats understood.

The spatio-temporal signature list in the remote terminal database 42 contains a transmit spatio-temporal signature, $H_t$, and a receive spatio-temporal signature, $H_r$, for every channel of operation for each remote terminal. In another enibodiment, a set of basis vectors that span the same column space as the transmit and receive spatio-temporal signatures are stored, for example by storing the largest singular values and the corresponding singular vectors of the signatures. In another embodiment, parameters from which the signature can be formed are stored, for example by storing the transmit and receive channel response matrices. In another embodiment, estimates of the quality (e.g., estimate error covariances) of the spatio-temporal signatures are stored as well. In yet another embodiment, parameters describing the uncertainty due to time variations of the spatio-temporal signatures are stored as well. The transmit spatio-tetnporal signature includes the effects of the propagation environment between the base station and the remote terminal, as well as any differences in frequency characteristics of the transmitters 14, antenna cables, and transmission antennas 18($a$, . . . ,$m$).

When the base station controller 1 forwards a call initialization request for a particular remote terminal via link 33, a channel selector 41 searches active remote terminal list 40 to find a communication channel that can accommodate the remote terminal. In the preferred embodiment, there is a receive active remote terminal list and a transmit active remote terminal list which are used by channel selector 41 in forming both a multiplexing spatio-temporal matrix and a demultiplexing spatio-temporal matrix for each channel. For each channel, the demultiplexing and the multiplexing spatio-temporal signature matrices are formed from the stored receive and transmit spatio-temporal signatures of each of the remote terminals currently active on (using) that channel plus an additional part containing the appropriate spatio-temporal signature of the remote terminal requesting a communication channel, see equations (10–23).

Channel selector 41 calculates functions of these signature matrices to assess whether or not communication between the base station and the new remote terminal can be successfully carried out on the selected channel. In the preferred embodiment, channel selector 41 first calculates spatio-temporal multiplexing and demultiplexing weights for that remote terminal and then uses these weights to estimate link performance.

In the illustrative embodiment, spatio-temporal multiplexing weight vector are the columns of the matrix $W_{tx}$. The $k^{th}$ column of $W_{tx}$ is given in equation (31):

$$\{W_{tx}\}_k = s_k^t \{ \mathcal{H}_t ( \mathcal{H}_t^* \mathcal{H}_t )^{-1} \}_{mL_t(k-1)+1} \quad k=1,\ldots,n_t, \tag{31}$$

where $(\cdot)^{-1}$ is the inverse of a matrix, $\{\cdot\}_k$ is the $k^{th}$ column of a matrix, $\mathcal{H}_t$ is the multiplexing spatio-temporal signature matrix associated with the relevant channel, and $S_k^t$ is the the amplitude of the $k^{th}$ signal to be transmitted. If the resulting multiplexing matrix is not stable, a stable approximation of the multiplexing matrix is formed as is well known in the art. The amplitudes to be transmitted, $s_k^t$, are calculated in the preferred embodiment using the remote terminal receiver mean-square noise voltages ($N_k$) and the minimum desired signal qualities ($SNR_k^{des}$) as given in equation (32):

$$s_k^t = (SNR_k^{des} \times N_k)^{1/2} \tag{32}$$

Now channel selector 41 calculates the average mean-square voltage (power) $\bar{P}_t$ to be transmitted from each element as the sum of squares of the appropriate elements of the weights $$\bar{P}_t = diag\left( [\bar{W}_{tx}^{1*} \ldots \bar{W}_{tx}^{n_{t*}}] \begin{bmatrix} \bar{W}_{tx}^1 \\ \vdots \\ \bar{W}_{tx}^{n_t} \end{bmatrix} \right), \tag{33}$$

where $\bar{W}_{tx}^k$ is the weight matrix for the $k^{th}$ user as defined in equation (21) and diag($\cdot$) is a vector obtained by stacking the diagonal elements of a matrix. The peak square voltage (power) $P_t^{paak}$ to be transmitted from each element is computed as the square of sum of the magnitude of the appropriate weights $$P_t^{peak} = diag\left( abs([\bar{W}_{tx}^{1*} \ldots \bar{W}_{tx}^{n_{t*}}]) abs \begin{bmatrix} \bar{W}_{tx}^1 \\ \vdots \\ \bar{W}_{tx}^{n_t} \end{bmatrix} \right), \tag{34}$$

where abs($\cdot$) is eleniient-wise absolute value. Channel selector 41 compares these values against the limits for each of the transmitters for each of the elements. If any of the average or peak values exceed the acceptable limits, the remote terminal in question is not assigned to the candidate channel. Otherwise, the ability to successfully receive from the remote terminal is checked.

In an alternate embodiment, the transmitter limits are used as inequality constraints in an optimization algorithm for calculating transmit weights that meet the specifications given and that also result in the minimum amount of transmitted power possible. If transmit weights satisfying the constraints can not be found, the remote terminal in question is not assigned to the candidate channel. Such optimization algorithms are well known.

In an alternative embodiment employing time division duplexing (TDD), the mtultiplexinig weights are chosen to be scaled versions of the demultiplexing weights since the channels and interference are assumed to be reciprocal. The scale parameter is chosen to provide sufficient SINR at the remote terminal.

To test the uplink, channel selector 41 calculates spatio-temporal demultiplexing weights $W_{rx}$ using the demultiplexing spatio-temporal signature matrix $\mathcal{H}_r$, associated with the relevant channel. In the illustrative embodiment, spatio-temporal demultiplexing weight vectors are the columns of the matrix $W_{rx}$ given in equation (35):

$$W_{rx} = (\mathcal{H}_r P_r \mathcal{H}_r^* + R_{nn})^{-1} \mathcal{H}_r \overline{P}_r, \quad (35)$$

where the $k^{th}$ column of $\overline{P}_r$ is given by equation (36)

$$\{\overline{P}_r\}_k = \{P_r\}_{L_r(k-1)+1} k=1, \ldots, n_r, \quad (36)$$

where $P_r$ is a (diagonal) matrix of mean-square amplitudes (powers) of the signals $s_r^{k,L_r}$, transmitted by the remote terminals $$P_r = E\left\{\begin{bmatrix} s_r^{1,L_r}(t) \\ \vdots \\ \vdots \\ s_r^{n_r,L_r} \end{bmatrix} [s_r^{1,L_r*}(t) \ldots s_r^{n_r,aL_r*}]\right\} \quad (37)$$

and $R_{nn} = E\{e_r(t)e_r^*(t)\}$ is the base station noise covariance. Then, the expected value of the normalized mean-squared error covariance is calculated in one embodiment as follows:

$$\overline{MSE} = \overline{P}_r^{-1/2}((I - W_{rx}^* \mathcal{H}_r) P_r (I - W_{rx}^* \mathcal{H}_r)^* + W_{rx}^* R_{nn} W_{rx}) \overline{P}_r^{-*/2} \quad (38)$$

where the notation $(\cdot)^{-*/2}$ indicates complex conjugate transpose of the square root of the matrix. The inverse of MSE is an estimate of the expected Signal-to-Interference-plus-Noise Ratio (SINR) at the output of the spatio-temporal demultiplexer:

$$\overline{SINR} = \overline{MSE}^{-1}. \quad (39)$$

If all of the diagonal elements of $\overline{SINR}$ are above the desired thresholds based on the signal quality required to be received from each remote terminal, the remote terminal is allowed access to the channel. If the candidate remote terminal is below its threshold and has the ability to increase its output power, the same computations are again performed for increasing remote terminal power output until either the maximum output power for that remote terminal is reached and the $\overline{SINR}$ is still insufficient, another remote terminal $\overline{SINR}$ falls below its threshold in which case its power is increased if possible, or all thresholds are exceeded. If acceptable remote terminal transmit powers can be found, the remote terminal is granted access to this particular channel, otherwise it is denied access and another channel is checked.

In an alternate embodiment, the calculation of demultiplexing weights is performed using well known optimization procedures with the objective of minimizing remote terminal transmit powers subject to estimated signals at the base station meeting or exceeding their minimum desired SINR's.

Also, in an alternate embodiment, in the case that no channel can be found to accommodate the remote terminal, channel selector 41 calculates whether some rearrangement of the existing remote terminals among the channels would allow the remote terminal to be supported on some channel. In this case, the remote terminal will only be denied communication at this time if no rearrangement of existing users allows the remote terminal to be accommodated.

In an alternate embodiment employing frequency division duplexing (FDD), remote terminals are not restricted to being assigned a fixed channel pair for transmit and receive. A sufficiently flexible system architecture is employed where channel selector 41 may choose to assign a particular remote to transmit and receive channels separated by different frequency duplex offsets in order to minimize overall system interference levels.

Spatio-temporal multiplexing and demultiplexing weights for remote terminals already using a channel must be recalculated because adding a new remote terminal to that channel may change them significantly. In the preferred embodiment, channel selector 41, having already done the necessary calculations, sends the new spatio-temporal multiplexing and demultiplexing weights to the spatio-temporal weight processor 43 for use in setting up the spatio-temporal multiplexer 23 and demultiplexer 20. In an alternate embodiment, spatio-temporal weight processor 43 uses the spatio-temporal signature matrices sent to it by channel selector 41 to calculate different sets of spatio-temporal multiplexing and demultiplexing weights for all of the remote terminals on that channel.

Spatio-temporal weight processor 43 then sends the new spatio-temporal demultiplexing weights to spatio-temporal deniultiplexers 20 and the new spatio-temporal multiplexing weights to the spatio-temporal multiplexers 23 for this channel, updates the active remote terminal list 40, and informs spatio-temporal processor controller 39 which in turn informs base station controller 3 of the selected channel. Base station controller 3 then transmits a message to the remote terminal using the downlink control channel that instructs the remote terminal to switch to the desired channel.

It can be shown from equation (31) that the multiplexing weights $W_{tx}$ have the property:

$$W_{tx}^* \mathcal{H}_t = \text{diag}(s'_1, \ldots, s'_{n_t}) \quad (40)$$

where $\text{diag}(\cdot)$ is a diagonal matrix with diagonal elements formed from a vector. This means that at the $k^{th}$ remote terminal, the signal intended to be sent to that terminal is received with a sufficient (positive real) amplitude $s'_k$. The fact that $W_{tx}^* \mathcal{H}_t$ has zero off-diagonal elements means that at the $k^{th}$ remote terminal, none of the other signals being transmitted are received by that remote terminal. In this manner, each remote terminal receives only the signals intended for it at the necessary power levels to ensure proper communications. In alternate embodiments, uncertainties in the estimates of $\mathcal{H}_t$ are incorporated in setting base station transmit power levels and calculating weights so as to minimize the effect of errors and/or changes in $\mathcal{H}_t$.

Similarly, at the base station the particular demultiplexing weights given in (35) have the property that conditioned on the knowledge of the receive spatio-temporal signatures and the transmitted voltages (powers) from the remote terminals, the estimated signals $\hat{S}$ given by:

$$\hat{S} = W_{rx}^* z_r, \quad (41)$$

are the most accurate in the sense of least mean-squared error. In particular, they most closely match the signals transmitted by the remote terminals given the measurements made at the base station by the multiple antenna elements.

Equations (31) and (35) represent only one way to calculate spatio-temporal multiplexing and demultiplexing weights. There are other similar strategies that demonstrate properties similar to those shown in equation (40) and described in the previous paragraph. Other well known techniques for calculating weights $W_{tx}$ and $W_{rx}$ account for uncertainty in multiplexing and demultiplexing spatio-temporal signature matrices $\mathcal{H}_t$ and $\mathcal{H}_r$, and can incorporate more complex power and dynamic range constraints.

Determining the Spatio-Temporal Signatures

As shown in FIG. 8, spatio-temporal processor 13 also contains a spatio-temporal signature processor 44 for finding the spatio-temporal signatures of the remote terminals. In the illustrative embodiment, spatio-temporal signature processor 44 uses the calibration techniques similar to the ones described in our U.S. Pat. No. 5,546,090 (issued 13 Aug., 1996) entitled "Method and Apparatus for Calibrating Antenna Arrays".

In the illustrative embodiment, each remote terminal is capable of entering a calibration mode. In the calibration mode, the remote terminal can transmit predetermined signals and also enter transponder mode where the received signal 49 is transmitted back to base station 1. The calibration mode is controlled by remote terminal CPU 68. Referring to FIG. 9, the transponsder mode is provided by switch 69 controlled by remote terminal CPU 68 through switch control signal 70.

To determine the transmit and receive spatio-temporal signatures of a remote terminal, spatio-temporal signature processor 44 commands the remote terminal to enter calibration mode by transmitting a command to it on the downlink channel. This command is generated by base station controller 3, based on a request from spatio-temporal processor controller 39, and modulated by signal modulators 24. In an alternative embodiment, calibration mode is entered regularly at predetermined instances.

The remote terminal then transmits predetermined terminal calibration signal on the channel. In the present embodiment, the terminal calibration signal is a known pseudo random noise sequence confined to the frequency band of of the current channel. In another embodiment, the predetermined terminal calibration signal is any known signal. Time samples of the received data are stored in an m by $N_r$ data matrix X which according to equation (5) and in the absence of noise and parameter offsets is given by $$X=h_r S_r \quad (42)$$

where $S_r$ is the $M_r$ by $N_r$ matrix of predetermined terminal calibration signals. The receive channel response matrix is then given by $$h_r = X S_r^\dagger \quad (43)$$

where $S_r^\dagger$ is the well known Moore-Penrose pseudo-inverse of the matrix $S_r$ satisfying $S_r S_r^\dagger = I$ (the identity matrix) for full-rank matrices $S_r$ having more columns than rows, $S_r^\dagger S_r = I$ for full-rank matrices $S_r$ having more rows than columns. The receive spatio-temporal signature $H_r$ can now be constructed from the channel matrix $h_r$.

In alternate embodiments, the receive spatio-temporal signature $H_r$ is determined directly by storing time samples of the spatio-temporal receive vector in an $mL_r$ by $N_r$ data matrix Z which according to equation (8) and in the absence of noise and parameter offsets is given by $$Z = H_r S_r \quad (44)$$

where in this case $S_r$ is the $M_r + L_r - 1$ by $N_r$ matrix of predetermined terminal calibration signals. The receive spatio-temporal signature is then given by $$H_r = Z S_r^\dagger. \quad (45)$$

Receive spatio-temporal signatures may be determined while other terminals are using the same channel.

In alternate embodiments the spatio-temporal demultiplexing weight vector is determined directly from equation (46):

$$w_{rx}^* Z = S_r. \quad (46)$$

where in this case $S_r$ is the 1 by $N_r$ vector containing the predetermined terminal calibration signal. The spatio-temporal demultiplexing weight vector is then given by $$w_{rx} = Z^{*\dagger} S_r^*. \quad (47)$$

Spatio-temporal demultiplexing weight vectors may be determined while other terminals are using the same channel.

In an alternative embodiment the terminal calibration signal is not completely known but has predetermined modulation format parameters. Several techniques known in the art make use of predetermined modulation format parameters, for example, a constant modulus signal to determine the receive channel matrix. Once the receive channel matrix is determined, the receive spatio-temporal signature is formed as described above. It is also clear to someone in the art how to determine the receive spatio-temporal signature or demultiplexing weight vector using the predetermined modulation format parameters of the terminal calibration signal.

In alternate embodiments related to those described in U.S. Pat. No. 5,546,090 (issued 13 Aug., 1996) entitled "Method and Apparatus for Calibrating Antenna Arrays", well known techniques are used to account for noise present in the system and parameter variations such as oscillator frequency offsets.

Once $H_r$ is known, demultiplexing weights are computed and the remote terminal enters transponder mode. Spatio-temporal signature processor 44 then transmits predetermined base station calibration signals 11, on the channel occupied by the remote terminal, by instructing multichannel transmitters 17($a$, ..., $m$) via transmitter control data 37 and spatio-temporal processor controller 39. In the present embodiment, the m signals (for each antenna) among the predetermined base station calibration signals 11 are different known pseudo random noise sequences confined to the frequency band of the current channel. In another embodiment, the predetermined base station calibration signals 11 are any known, distinct, signals.

The remote terminal shown in FIG. 9 transmits back the signal received at the remote terminal. This transponded signal is received by multichannel receivers 15 in base station 1 shown in FIG. 1 and supplied to spatio-temporal signature processor 44 shown in FIG. 8. Time samples of the received data are processed by the demultiplexing weights and the resulting signal is stored in a 1 by $N_t$ data matrix $Z_t$ which according to equation (14) and in the absence of noise and parameter offsets is given by $$Z_t = k[h_t^T(1) \ldots h_t^T(L_t)] S_t \quad (48)$$

where $S_t$ is the $mL_t$ by $N_t$ matrix of predetermined base station calibration signals and k is a known amount by which the signal is amplified in the remote terminal before transmission back to the base station.

The transmit channel response is then given by $$[h_t^T(1) \ldots h^T(L_t)] = k^{-1} Z_t S_t^\dagger. \quad (49)$$

The transmit spatio-temporal signature $H_t$ can now be formed from the transmit channel response.

In an alternative embodiment the base station calibration signal is not completely known but has predetermined modulation format parameters. Several techniques known in the art make use of predetermined modulation format parameters to determine the transmit channel matrix.

In alternate embodiments also described in U.S. Pat. No. 5,546,090 (issued 13 Aug., 1996) entitled "Method and Apparatus for Calibrating Antenna Arrays", well known techniques are used to account for noise present in the system and parameter variations such as oscillator frequency offsets.

In an alternative embodiment, the calibration mode only consists of the transponder model described above. The receive channel matrix is then determined through one of several techniques described in the literature, see for example E. Moulines, P. Duhamel, J. -F. Cardoso, and S. Mayrargue, "Subspace methods for the blind identification of multichannel FIR filters," *IEEE Transactions on Signal Processing*, 43(2):516–525, February 1995.

Spatio-temporal signature processor 44 stores the new spatio-temporal signatures in remote terminal database 42. Upon completion, spatio-temporal signature processor 44 commands the remote terminal to exit calibration mode by transmitting a command to it on the downlink channel.

In one alternate embodiment, computation of remote terminal transmit spatio-temporal signatures can be performed directly by the remote terminals. This embodiment of the remote terminal is shown in FIG. 10. In calibration mode, spatio-temporal signature processor 44 transmits predetermined calibration signals 11, on the channel to be calibrated by the remote terminals, as before. Remote terminal CPU 68 uses received calibration signals 50 and the known transmitted waveforms to compute the remote terminal's transmit spatio-temporal signature using the same techniques used by spatio-temporal signature processor 44 in the previous embodiment. The computed transmit spatio-temporal signature is transmitted back to base station 1 through modulator 57 and transmitter 60 as control data to be transmitted 58. When received by base station 1, spatio-temporal signature processor 44 stores the new transmit spatio-temporal signature in remote terminal database 42. Since each remote terminal performs the transmit spatio-temporal signature calculation independently, this arrangement allows multiple remote terminals to compute their own transmit spatio-temporal signature simultaneously on the same channel. In this embodiment, remote terminal receive spatio-temporal signatures are computed by spatio-temporal signature processor 44 in the same manner as in the previous embodiment.

Using these techniques, spatio-temporal signature processor 44 can measure remote terminal transmit and receive spatio-temporal signatures for a particular channel any time that channel is idle. The efficiency of these calibration techniques allow spatio-temporal signature processor 44 to update the spatio-temporal signatures of numerous remote terminals for a particular channel while occupying that channel for only a short time.

In an alternative embodiment, the receive spatio-temporal signatures are obtained in a decision-directed feedback mode. The receive data is demodulated and then remodulated to produce an estimate of the original modulated signal. These techniques allow receive spatio-temporal signatures to be estimated even when multiple remote terminals are occupying a single channel.

In yet another embodiment, the system can be designed to continuously update the spatio-temporal signatures of the remote terminals in a "closed loop" manner. This is done to account for the time variation of spatio-temporal signatures due to, for example, motion of the remote terminal or changes in the RF propagation conditions. To do this, both the base station and the remote terminal periodically transmit predetermined training sequences. Each remote terminal currently active on a particular channel is assigned a different predetermined training sequence and is given the training sequences for all other remote terminals currently active on that particular channel. In one embodiment, the different training sequences are orthogonal in the sense that the inner product of any two of the training sequence waveforms is zero. Each time the training sequences are transmitted, each remote terminal calculates how much of each training sequence it has received using well known techniques, and transmits this information to the base station.

In the illustrative embodiment, the base station uses the receiver outputs and knowledge of the transmitted waveforms to calculate the remote terminal receive spatio-temporal signatures. In another embodiment, the base station calculates how much of each remotely transmitted training sequence has come through on each output of the spatio-temporal demultiplexer, expressed as a complex coupling coefficients. Knowledge of these coupling coefficients allows the currently active receive and transmit spatio-temporal signatures to be corrected so as to reduce mutual interference using well know techniques.

Finally, in systems that use time division duplexing (TDD) for full-duplex communications, as is well known in the art, the transmit and receive frequencies are the same. In this case, using the well known principle of reciprocity, the transmit and receive spatio-temporal signatures are directly related. Thus, this embodiment determines only one of the signatures, for example the receive spatio-temporal signature, and the other, in this case the transmit spatio-temporal signature, is calculated from the first (receive) spatio-temporal signature and knowledge of the relative phase and amplitude characteristics of multichannel receivers 15 and multichannel transmitters 14.

Network Level Spatio-Temporal Processing

Figure 11:
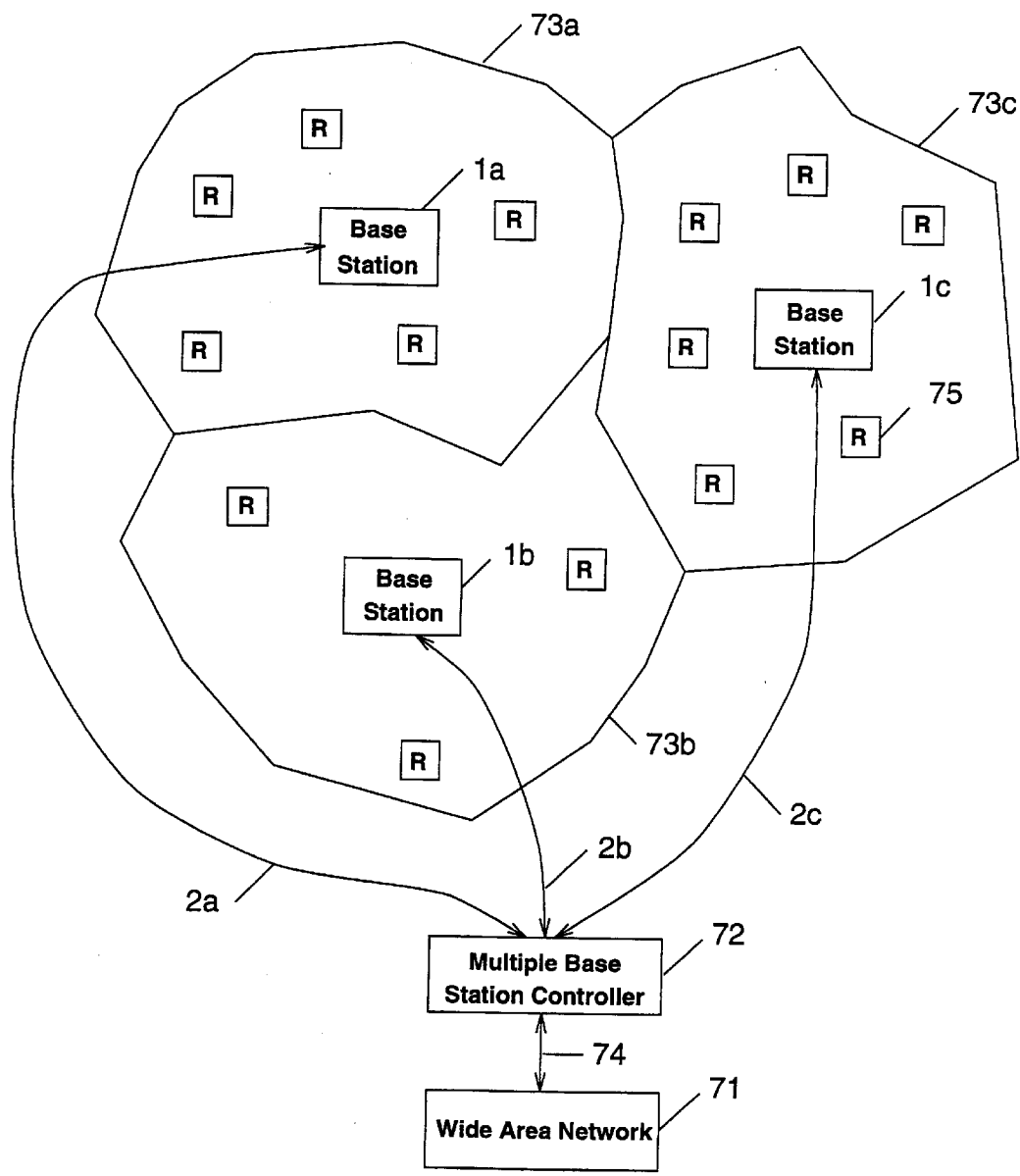
FIG. 11 is a schematic diagram of a network system comprised of three base stations and a multiple base station controller.

In the embodiment illustrated herein, the spatio-temporal processor for each base station in the cellular-like wireless communication system operates independently to maximize the number of communication channels in the immediate cell. However, significant system capacity improvements can be realized if the spatio-temporal processor from each base station communicates with and coordinates its efforts with the spatio-temporal processors from other nearby cells. A specific embodiment is shown in FIG. 11.

A multiple base station controller 72 acts as the interface between the wide area network 71 through link 74 and base stations 1 (*a,b,c*) via base station communication links 2 (*a,b,c*). Each base station is responsible for providing coverage to a number of remote terminals. In one embodiment, each remote terminal is assigned to only one base station thus defining cell boundaries 73 (*a,b,c*) within which all remote terminals attached to a particular base station are located. Users equipped with remote terminals 75 are identified by a boxed "R" in the figure.

Each spatio-temporal processor contained in base stations 1 (*a,b,c*) measures and stores the spatio-temporal signatures of the remote terminals in its cell and also of the remote terminals in adjacent cells. The determination of spatio-temporal signatures of the remote terminals in adjacent cells is coordinated by multiple base station controller 72 through base station communication links 2 (*a,b,c*). Through base station communication links 2 (*a,b,c*) and multiple base station controller 72, spatio-temporal processors in base stations 1 (*a,b,c*) from adjacent cells inform each other of which remote terminals they are communicating with on which channels. Each spatio-temporal processor includes the spatio-temporal signatures of remote terminals that are currently active in adjacent cells to form extended multiplexing and demultiplexing spatio-temporal signature matrices $\mathcal{H}_t$ and $\mathcal{H}_r$ which are sent to all the adjacent base stations. The channel selectors in each base station, using these extended spatio-temporal signature matrices, jointly assign remote terminals to each channel in each of base stations 1 (a,b,c).

The resulting multiplexing and demultiplexing weights $W_{tx}$ and $W_{rx}$ for each base station are then calculated using extended multiplexing and demultiplexing signature matrices $\mathcal{H}_t$ and $\mathcal{H}^r$. In calculating the weights, the objective is to minimize the signal transmitted to and received from the adjacent cell's active remote terminals, thereby allowing many more remote terminals to simultaneously communicate.

In an alternate embodiment, multiple base station controller 72 assigns remote terminals requesting access to base stations dynamically using a list of active remote terminal/base station/channel links, the associated remote terminal databases, and the particular requirements for the link to be assigned. Additionally, remote terminals can employ multiple (directional) transmit and receive antennas, to facilitate directive links to multiple nearby base stations as instructed by multiple base station controller 72 to further increase system capacity.

Advantages

The apparatus and method in accordance with the invention provides a significant advantage over the prior art in that it allows many more remote terminals to simultaneously share the same communication channel by simultaneous spatio-temporal multiplexing/demultiplexing. Moreover, signals received front and transmitted to the remote terminals have substantially improved signal-to-noise, reduced interference, and improved quality in multipath environments compared to a standard base station.

Thus, a wireless communication system can support many times more conversations, or have a much greater data throughput, with the same amount of spectrum. Alternatively, a wireless communication system can support the same number of conversations or data throughput with much less spectrum.

Alternate Embodiments

In one alternate embodiment, transmission antennas 18(a, . . . ,m) and reception antennas 19(a, . . . ,m) at base station 1 are replaced by a single array of in antennas. Each element in this array is attached to both its respective component of multichannel transmitters 14 and its respective component of multichannel receivers 15 by means of a duplexer.

In another alternate embodiment, signals on the uplink control channel may be processed in real time using the spatio-temporal processing described in co-pending patent application Ser. No. 07/806,695. This would allow multiple remote terminals to request a communication channel at the same time.

In yet another embodiment for applications involving data transfer of short bursts or packets of data, no separate uplink control channel is required and the system may service requests for communication and other control functions during control time intervals that are interspersed with communications intervals.

While the above description contains many specificities, these should not be construed as limitations on the scope of the invention, but rather as an exemplification of one preferred embodiment thereof. Many other variations are possible. Accordingly, the scope of the invention should be determined not by the illustrated embodiments, but by the appended claims and their legal equivalents.

What is claimed is:

1. A wireless system for calculating uplink signals transmitted from a plurality of remote terminals using a common uplink channel, said system including at least one base station, said system comprising:

receiving means at said at least one base station including a plurality of antenna elements and receivers for producing measurements of combinations of said uplink signals from said plurality of remote terminals using said common uplink channel;

receive spatio-temporal processing means for determining and storing receive spatio-temporal signatures for said plurality of remote terminals using said measurements; and spatio-temporal demultiplexing means using said receive spatio-temporal signatures and said measurements to produce separated uplink signals.

2. In a wireless system a method for calculating uplink signals transmitted from a plurality of remote terminals using a common uplink channel, said system including at least one base station, said at least one base station including a plurality of antenna elements and receivers for producing measurements of combinations of said uplink signals from said plurality of remote terminals using said common uplink channel, said method comprising the steps of:

receiving at the receivers of said at least one base station measurements of combinations of said uplink signals from said plurality of remote terminals using said common uplink channel;

receive spatio-temporal processing for determining and storing receive spatio-temporal signatures for said plurality of remote terminals using said measurements; and spatio-temporal demultiplexing using said receive spatio-temporal signatures and said measurements to produce separated uplink signals.

3. The wireless system as defined by claim 1 wherein said receive spatio-temporal processing means comprises:

a spatio-temporal signature list comprising a receive spatio-temporal signature for each remote terminal in said plurality of remote terminals and said common uplink channel;

receive spatio-temporal signature determining means for determining said receive spatio-temporal signatures; and a receive channel selector utilizing said receive spatio-temporal signatures to determine whether said common uplink channel can be further shared by an additional remote terminal.

4. The method defined by claim 2 wherein said receive spatio-temporal processing further comprises:

determining a receive spatio-temporal signature for each remote terminal in said plurality of remote terminals and said common uplink channel;

forming a spatio-temporal signature list comprising said receive spatio-temporal signatures; and channel selecting utilizing said receive spatio-temporal signatures to determine whether said common uplink channel can be further shared by an additional remote terminal.

5. The wireless system as defined by claim 3 wherein said receive spatio-temporal processing means further comprises:

a receive spatio-temporal weight processor for calculating spatio-temporal demultiplexing weights for said plurality of remote terminals, said spatio-temporal demultiplexing weights being utilized by said spatio-temporal demultiplexing means to calculate said uplink signals.

6. The method as defined by claim 4 wherein said receive spatio-temporal processing further comprises:
  receive spatio-temporal weight processing for determining spatio-temporal demultiplexing weights for said plurality of remote terminals, said spatio-temporal demultiplexing weights being utilized by said spatio-temporal demultiplexing step to calculate said uplink signals.

7. The wireless system as defined by claim 5 wherein said receive spatio-temporal processor determines said spatio-temporal demultiplexing weights as the columns of matrix $W_{rx}$ as follows:

$$W_{rx} = (\mathcal{H}_r P_r \mathcal{H}_r^* + R_{nn})^{-1} \mathcal{H}_r \overline{P}_r,$$

where $(\cdot)^*$ denotes the complex conjugate transpose of a matrix, $(\cdot)^{-1}$ denotes the inverse of a matrix, $R_{nn}$ is the noise covariance matrix of said receivers, $\overline{P}_r$ is a matrix of transmit powers of the remote terminals in said plurality of remote terminals, and $\mathcal{H}_r$ is a demultiplexing spatio-temporal signature matrix composed of said receive spatio-temporal signatures for said plurality of remote terminals and said common uplink channel.

8. The method as defined by claim 6 wherein said receive spatio-temporal processing step determines said spatio-temporal demultiplexing weights as the columns of matrix $W_{rx}$ as follows:

$$W_{rx} = (\mathcal{H}_r P_r \mathcal{H}_r^* + R_{nn})^{-1} \mathcal{H}_r \overline{P}_r,$$

where $(\cdot)^*$ denotes the complex conjugate transpose of a matrix, $(\cdot)^{-1}$ denotes the inverse of a matrix, $R_{nn}$ is the noise covariance matrix of said receivers, $\overline{P}_r$ is a matrix of transmit powers of the remote terminals in said plurality of remote terminals, and $\mathcal{H}_r$ is a demultiplexing spatio-temporal signature matrix composed of said receive spatio-temporal signatures for said plurality of remote terminals and said common uplink channel.

9. The wireless system as defined by claim 1 wherein said common uplink channel is one of a plurality of uplink channels and wherein said receive spatio-temporal processing means comprises:
  an active remote terminal list of remote terminals assigned to at least one channel of said plurality of uplink channels;
  a spatio-temporal signature list comprising a receive spatio-temporal signature for each remote terminal of said plurality of remote terminals and each channel of said plurality of said uplink channels;
  receive spatio-temporal signature determining means for determining said receive spatio-temporal signatures in said spatio-temporal signature list;
  a receive channel selector using said active remote terminal list and said receive spatio-temporal signature list to determine assignments of each remote terminal in said active remote terminal list to at least one of the channels of said plurality of uplink channels; and
  a receive spatio-temporal weight processor for calculating spatio-temporal demultiplexing weights for each of the terminals in said active remote terminal list and each channel of said plurality of uplink channels assigned to at least one of the terminals in said active remote terminal list, said spatio-temporal demultiplexing weights being utilized by said spatio-temporal demultiplexing means to calculate said uplink signals.

10. The method as defined by claim 2 wherein said common uplink channel is one of a plurality of uplink channels and wherein said receive spatio-temporal processing step further comprises:
  determining a receive spatio-temporal signature for each remote terminal of said plurality of remote terminals and each channel of said plurality of said uplink channels;
  forming an active remote terminal list of remote terminals assigned to at least one channel of said plurality of uplink channels;
  forming a spatio-temporal signature list comprising said receive spatio-temporal signatures;
  receive channel selecting using said active remote terminal list and said receive spatio-temporal signature list to determine assignments of each remote terminal in said active remote terminal list to at least one of the channels of said plurality of uplink channels; and
  receive spatio-temporal weight processing for determining spatio-temporal demultiplexing weights for each of the terminals in said active remote terminal list and each channel of said plurality of uplink channels assigned to at least one of the terminals in said active remote terminal list, said spatio-temporal demultiplexing weights being utilized by said spatio-temporal demultiplexing step to calculate said uplink signals.

11. The wireless system as defined by claim 1 wherein said common uplink channel is one of a plurality of uplink channels, said at least one base station is one of a plurality of base stations, said receive spatio-temporal processing means is one of a plurality of receive spatio-temporal processing means, each base station in said plurality of base stations having a corresponding receive spatio-temporal processing means in said plurality of receive spatio-temporal means comprising:
  an active remote terminal list comprising a list of remote terminals assigned to at least one channel of said plurality of uplink channels,
  a spatio-temporal signature list comprising a receive spatio-temporal signature for each remote terminal of said plurality of remote terminals and each channel of said plurality of uplink channels
  receive spatio-temporal signature determining means for determining said receive spatio-temporal signatures in said spatio-temporal signature list, and
  a receiver spatio-temporal weight processor for calculating spatio-temporal demultiplexing weights for each of the terminals in said active remote terminal list and each channel of said plurality of uplink channels assigned to at least one of the terminals in said active remote terminal list, said spatio-temporal demultiplexing weights being utilized by said spatio-temporal demultiplexing means to calculate said uplink signals,
  said system further comprising:
    joint channel selector means for jointly determining assignments of each remote terminal in each said active remote terminal list to at least on of the channels of said plurality of uplink channels and to at least one of base stations of said plurality of base stations, and
    communication means for communicating the status of said assignments between each base station in said plurality of base stations and said joint channel selector means.

12. The method as defined by claim 2 wherein said common uplink channel is one of a plurality of uplink channels, said at least one base station is one of a plurality of base stations, said method further comprising:

forming an active remote terminal list comprising a list of remote terminals assigned to at least one channel of said plurality of uplink channels;

determining a receive spatio-temporal signature for each remote terminal of said plurality of remote terminals and each channel of said plurality of uplink channels;

forming a spatio-temporal signature list comprising said receive spatio-temporal signatures;

receiver spatio-temporal weight processing for determining the spatio-temporal demultiplexing weights for each of the terminals in said active remote terminal list and each channel of said plurality of uplink channels assigned to at least one of the terminals in said active remote terminal list, said spatio-temporal demultiplexing weights being utilized by said spatio-temporal demultiplexing step to calculate said uplink signals;

joint channel selecting for jointly determining assignments of each remote terminal in each said active remote terminal list to at least on of the channels of said plurality of uplink channels and to at least one of base stations of said plurality of base stations; and communicating the status of said assignments between each base station in said plurality of base stations.

13. The wireless system as defined by claim 1 and including transmission means comprising a transmitter and an antenna for sending downlink signals from said at least one base station to the terminals in said plurality of remote terminals.

14. The method as defined by claim 2 further including sending downlink signals from said at least one base station to the terminals in said plurality of remote terminals.

15. The wireless system as defined by claim 1 wherein said spatio-temporal demultiplexing means calculates spatio-temporal demultiplexing weights for said common uplink channel as the columns of a matrix $W_{rx}$ as follows:

$$W_{rx} = (\mathcal{H}_r P_r \mathcal{H}_r^* + R_{nn})^{-1} \mathcal{H}_r \bar{P}_r,$$

where $(\cdot)^*$ denotes the complex conjugate transpose of a matrix, $(\cdot)^{-1}$ denotes the inverse of a matrix, $R_{nn}$ is the noise covariance matrix of said receiver means, $\bar{P}_r$ is a matrix of transmit powers of the remote terminals in said plurality of remote terminals, and $\mathcal{H}_r$ is a demultiplexing spatio-temporal signature matrix composed of said receive spatio-temporal signatures for said plurality of remote terminals and said common uplink channel, said spatio-temporal demultiplexing means using said spatio-temporal demultiplexing weights to calculate said uplink signals.

16. The method as defined by claim 2 wherein said spatio-temporal demultiplexing calculates spatio-temporal demultiplexing weights for said common uplink channel as the columns of a matrix $W_{rx}$ as follows:

$$W_{rx} = (\mathcal{H}_r P_r \mathcal{H}_r^* + R_{nn})^{-1} \mathcal{H}_r \bar{P}_r,$$

where $(\cdot)^*$ denotes the complex conjugate transpose of a matrix, $(\cdot)^{-1}$ denotes the inverse of a matrix, $R_{nn}$ is the noise covariance matrix of said receivers, $\bar{P}_r$ is a matrix of transmit powers of the remote terminals in said plurality of remote terminals, and $\mathcal{H}_r$ is a demultiplexing spatio-temporal signature matrix composed of said receive spatio-temporal signatures for said plurality of remote terminals and said common uplink channel, said spatio-temporal demultiplexing method using said spatio-temporal demultiplexing weights to calculate said uplink signals.

17. The wireless system as defined by claim 1 wherein said uplink signals have predetermined modulation format parameters, and said receive spatio-temporal processing means determines said spatio-temporal demultiplexing weights using said predetermined modulation format parameters of said uplink signals from said plurality of remote terminals.

18. The method as defined by claim 2 wherein said uplink signals have predetermined modulation format parameters, and wherein said receive spatio-temporal processing step determines said spatio-temporal demultiplexing weights using said predetermined modulation format parameters of said uplink signals from said plurality of remote terminals.

19. The wireless system as defined by claim 1 wherein said receive spatio-temporal processing means determines said spatio-temporal demultiplexing weights using predetermined calibration signals transmitted by each remote terminal of said plurality of remote terminals.

20. The method as defined by claim 2 wherein said receive spatio-temporal processing step determines said spatio-temporal demultiplexing weights using predetermined calibration signals transmitted by each remote terminal of said plurality of remote terminals.

21. The wireless system as defined by claim 1 wherein said system includes a transponder co-located with each remote terminal of said plurality of remote terminals and wherein said receive spatio-temporal processing means determines said receive spatio-temporal signatures using signals transponded from at least one of the transponders.

22. The method as defined by claim 2 wherein said system includes a transponder co-located with each remote terminal of said plurality of remote terminals, said method includes transponding signals received at least one of said remote terminals, and wherein said receive spatio-temporal processing step determines said receive spatio-temporal signatures using said transponded signals.

23. The wireless system as defined by claim 1 wherein each remote terminal of said plurality of remote terminals includes a transponder and said receive spatio-temporal processing means determines said receive spatio-temporal signatures using signals transponded from at least one of the transponders.

24. The method as defined by claim 2 wherein each remote terminal of said plurality of remote terminals includes a transponder, said method includes transponding signals received at least one of said remote terminals, and said receive spatio-temporal processing step determines said receive spatio-temporal signatures using said transponded signals.

25. The wireless system as defined by claim 1 wherein the location and directivity of said antenna elements are known, and wherein said receive spatio-temporal processing means determines said receive spatio-temporal signatures using the known location and directivity of said antenna elements, and wherein said receive spatio-temporal processing means estimates the directions of arrival of said uplink signals from said plurality of remote terminals.

26. The method as defined by claim 2 wherein the location and directivity of said antenna elements are known, and wherein said receive spatio-temporal processing step determines said receive spatio-temporal signatures using the known location and directivity of said antenna elements, and wherein said receive spatio-temporal processing step estimates the directions of arrival of said uplink signals from said plurality of remote terminals.

27. The wireless system as defined by claim 1 wherein the location and directivity of said antenna elements, and the location of said plurality of remote terminals are known and wherein said receive spatio-temporal processing means determines said receive spatio-temporal signatures using the known location and directivity of said antenna elements and the known location of said plurality of remote terminals.

28. The method as defined by claim 2 wherein the location and directivity of said antenna elements, and the location of said plurality of remote terminals are known, and wherein said receive spatio-temporal processing step determines said receive spatio-temporal signatures using the known location and directivity of said antenna elements and the known location of said plurality of remote terminals.

29. The wireless system as defined by claim 1 wherein said uplink signals have predetermined modulation format parameters, and said receive spatio-temporal processing means determines said receive spatio-temporal signatures using said predetermined modulation format parameters of said uplink signals from said plurality of remote terminals.

30. The method as defined by claim 2 wherein said uplink signals have predetermined modulation format parameters, and wherein said receive spatio-temporal processing step determines said receive spatio-temporal signatures using said predetermined modulation format parameters of said uplink signals from said plurality of remote terminals.

31. The wireless system as defined by claim 1 wherein said receive spatio-temporal processing means determines said receive spatio-temporal signatures using predetermined calibration signals transmitted by each remote terminal of said plurality of remote terminals.

32. The method as defined by claim 2 wherein said receive spatio-temporal processing step determines said receive spatio-temporal signatures using predetermined calibration signals transmitted by each remote terminal of said plurality of remote terminals.

33. The wireless system as defined by claim 1 further comprising:
   transmission means including a plurality of transmit antenna elements and transmitters for transmitting multiplexed downlink signals to said plurality of remote terminals using a common downlink channel,
   transmit spatio-temporal processing means for determining and storing transmit spatio-temporal signatures for said plurality of remote terminals, and
   spatio-temporal multiplexing means using said transmit spatio-temporal signatures and downlink signals to produce said multiplexed downlink signals.

34. The method as defined by claim 2, wherein said system further comprises a plurality of transmit antenna elements and transmitters for transmitting multiplexed downlink signals to said plurality of remote terminals using a common downlink channel, the method further comprising:
   transmitting the multiplexed downlink signals to said plurality of remote terminals using a common downlink channel,
   transmit spatio-temporal processing for determining and storing transmit spatio-temporal signatures for said plurality of remote terminals, and
   spatio-temporal multiplexing using said transmit spatio-temporal signatures and downlink signals to produce said multiplexed downlink signals.

35. The wireless system as defined by claim 33 wherein said receiving means and said transmission means share common antenna elements using duplexers.

36. The method as defined by claim 34 further comprising sharing common antenna elements for said receivers and said transmitters using duplexers.

37. The wireless system as defined by claim 33 wherein said receiving means and said transmission means share common antenna elements using transmit/receive switches.

38. The method as defined by claim 34 further comprising switching common antenna elements between said receivers and said transmitters.

39. The wireless system as defined by claim 33 wherein said common uplink channel is one of a plurality of uplink channels, said common downlink channel is one of a plurality of downlink channels, and wherein said receive spatio-temporal processing means and said transmit spatio-temporal processing means comprises:
   an active remote terminal list comprising a list of remote terminals assigned to at least one of the channels of said plurality of uplink channels and remote terminals assigned to at least one of the channels of said plurality of downlink channels,
   a spatio-temporal signature list comprising a receive spatio-temporal signature for each remote terminal of said plurality of remote terminals and each channel of said plurality of uplink channels, and a transmit spatio-temporal signature for each remote terminal of said plurality remote terminals and each of channel of said plurality downlink channels,
   receive spatio-temporal signature determining means for determining said receive spatio-temporal signatures,
   transmit spatio-temporal signature determining means for determining said transmit spatio-temporal signatures, and
   a channel selector using said active remote terminal list and said spatio-temporal signature list to determine assignments of each remote terminal of said active remote terminal list to at least one of the channels of said plurality of uplink channels and at least one of the channels of said plurality of downlink channels.

40. the method as defined by claim 34 wherein said common uplink channel is one of a plurality of uplink channels, said common downlink channel is one of a plurality of downlink channels, wherein said receive spatio-temporal processing step and said transmit spatio-temporal processing step further comprise:
   forming an active remote terminal list comprising a list of remote terminals assigned to at least one of the channels of said plurality of uplink channels and remote terminals assigned to at least one of the channels of said plurality of downlink channels;
   determining as part of said receive spatio-temporal processing step a receive spatio-temporal signature for each remote terminal of said plurality of remote terminals and each channel of said plurality of uplink channels;
   determining as part of said transmit spatio-temporal processing step a transmit spatio-temporal signature for each remote terminal of said plurality remote terminals and each of channel of said plurality downlink channels;
   forming a spatio-temporal signature list comprising the determined receive spatio-temporal signatures and the determined transmit spatio-temporal signatures; and
   channel selecting using said active remote terminal list and said spatio-temporal signature list to determine assignments of each remote terminal of said active remote terminal list to at least one of the channels of said plurality of uplink channels and at least one of the channels of said plurality of downlink channels.

41. The wireless system as defined by claim 39 wherein said receive spatio-temporal processing means and said transmit spatio-temporal processing means further comprise:

- a receive spatio-temporal weight processor for calculating spatio-temporal demultiplexing weights for each of the terminals in said active remote terminal list to which an uplink channel is assigned and for each channel of said plurality of uplink channels assigned to at least one of the terminals in said active remote terminal list, said spatio-temporal demultiplexing weights being utilizied by said spatio-temporal demultiplexing means to calculate said uplink signals, and
- a transmit spatio-temporal weight processor for calculating spatio-temporal multiplexing weights for each of the terminals in said active remote terminal list to which a downlink channel is assigned and each channel of said plurality of downlink channels assigned to at least one of the terminals in said active remote terminal list, said spatio-temporal multiplexing weights being utilized by said spatio-temporal multiplexing means to produce said multiplexed downlink signals.

42. The method as defined by claim 40 wherein said receive spatio-temporal processing step and said transmit spatio-temporal processing step further comprise:

- receive spatio-temporal weight processing for determining spatio-temporal demultiplexing weights for each of the terminals in said active remote terminal list to which an uplink channel is assigned and for each channel of said plurality of uplink channels assigned to at least one of the terminals in said active remote terminal list, said spatio-temporal demultiplexing weights being utilized by said spatio-temporal demultiplexing step to calculate said uplink signals; and
- transmit spatio-temporal weight processing for determining spatio-temporal multiplexing weights for each of the terminals in said active remote terminal list to which a downlink channel is assigned and each channel of said plurality of downlink channels assigned to at least one of the terminals in said active remote terminal list, said spatio-temporal multiplexing weights being utilized by said spatio-temporal multiplexing step to produce said multiplexed downlink signals.

43. The wireless system as defined by claim 33 wherein said common uplink channel is one of a plurality of uplink channels, said common downlink channel is one of a plurality of downlink channels, each base station in said plurality of base stations having receive spatio-temporal processing means in said plurality of receive spatio-temporal processing means, each transmit spatio-temporal processing means is one of a plurality of transmit spatio-temporal processing means comprising:

- an active remote terminal list comprising a list of remote terminals assigned to at least one of the channels of said plurality of uplink channels and remote terminals assigned to at least one of the channels of said plurality of downlink channels;
- a spatio-temporal signature list comprising a receive spatio-temporal signature for each remote terminal of said plurality of remote terminals and each channel of said plurality of uplink channels, and a transmit spatio-temporal signature for each remote terminal of said plurality of remote terminals and each channel of said plurality of down-link channels;
- receive spatio-temporal signature determining means for determining said receive spatio-temporal signature;
- transmit spatio-temporal signature determining means for determining said transmit spatio-temporal signatures;
- a receive spatio-temporal weight processor for calculating spatio-temporal demultiplexing weights for each of the terminals in said active remote terminal list to which an uplink channel is assigned and each channel of said plurality of uplink channels assigned to at least one of the terminals in said active remote terminal list, said spatio-temporal demultiplexing weights being utilized by said spatio-temporal demultiplexing means to calculate said uplink signals; and
- a transmit spatio-temporal weight processor for calculating spatio-temporal multiplexing weights for each of the terminals in said active remote terminal list to which a downlink channel is assigned and each channel of said plurality of downlink channels assigned to at least one of the terminals in said active remote terminal list, said spatio-temporal multiplexing weights being utilized by said spatio-temporal multiplexing means to produce said multiplexed downlink signals, said system further comprising:

- joint channel selector means for jointly determining assignments of each remote terminal in each said active remote terminal list to at least one of the channels of said plurality of uplink channels, to at least one of the channels of said plurality of downlink channels and to at least one of the base stations of said plurality of base stations; and
- communication means for communicating said assignments between each base station in said plurality of base stations and said joint channel selector means.

44. The method as defined by claim 34 wherein said common uplink channel is one of a plurality of uplink channels, said common downlink channel is one of a plurality of downlink channels, each base station in said plurality of base stations carrying out said receive spatio-temporal processing step and said transmit spatio-temporal processing step, wherein said receive spatio-temporal processing step and said transmit spatio-temporal processing step further comprise:

- forming an active remote terminal list comprising a list of remote terminals assigned to at least one of the channels of said plurality of uplink channels and remote terminals assigned to at least one of the channels of said plurality of downlink channels;
- determining as part of said receive spatio-temporal processing step a receive spatio-temporal signature for each remote terminal of said plurality of remote terminals and each channel of said plurality of uplink channels;
- determining as part of said transmit spatio-temporal processing step a transmit spatio-temporal signature for each remote terminal of said plurality remote terminals and each of channel of said plurality downlink channels;
- forming a spatio-temporal signature list comprising the determined receive spatio-temporal signatures and the determined transmit spatio-temporal signatures; and
- receive spatio-temporal weight processing for determining spatio-temporal demultiplexing weights for each of the terminals in said active remote terminal list to which an uplink channel is assigned and each channel of said plurality of uplink channels assigned to at least one of the terminals in said active remote terminal list, said spatio-temporal demultiplexing weights being utilized by said spatio-temporal demultiplexing step to calculate said uplink signals;

transmit spatio-temporal weight processing for determining spatio-temporal multiplexing weights for each of the terminals in said active remote terminal list to which a downlink channel is assigned and each channel of said plurality of downlink channels assigned to at least one of the terminals in said active remote terminal list, said spatio-temporal multiplexing weights being utilized by said spatio-temporal multiplexing step to produce said multiplexed downlink signals;

joint channel selecting channel for jointly determining assignments of each remote terminal in each said active remote terminal list to at least one of the channels of said plurality of uplink channels, to at least one of the channels of said plurality of downlink channels and to at least one of the base stations of said plurality of base stations; and communicating said determined assignments between each base station in said plurality of base stations.

45. The wireless system as defined by claim 33 wherein said spatio-temporal multiplexing means determines spatio-temporal multiplexing weight vectors for said common downlink channel as the columns of a matrix $W_{tx}$ as follows:

$$\{W_{tx}\}_k = s_k^{t}\{(\mathcal{H}_t \mathcal{H}_t^*  \mathcal{H}_t)^{-1}\}_{mL_t(k-1)+1} \quad k=1,\ldots,n_t,$$

where $(\cdot)^*$ denotes the complex conjugate transpose of a matrix, $(\cdot)^{-1}$ denotes the inverse of a matrix, $\{\cdot\}_k$ denotes the $k^{th}$ column of a matrix, $s_k^t$ is the amplitude of the $k^{th}$ said downlink signal, and $\mathcal{H}_t$ is a multiplexing spatio-temporal signature matrix composed of said transmit spatio-temporal signatures for said plurality of remote terminals and said common downlink channel and wherein said spatio-temporal multiplexing means utilizes said spatio-temporal multiplexing weights to produce said multiplexed downlink signals.

46. The method as defined by claim 34 wherein said spatio-temporal multiplexing step determines spatio-temporal multiplexing weight vectors for said common downlink channel as the columns of a matrix $W_{tx}$ as follows:

$$\{W_{tx}\}_k = s_k^{t}\{(\mathcal{H}_t \mathcal{H}_t^*  \mathcal{H}_t)^{-1}\}_{mL_t(k-1)+1} \quad k=1,\ldots,n_t,$$

where $(\cdot)^*$ denotes the complex conjugate transpose of a matrix, $(\cdot)^{-1}$ denotes the inverse of a matrix, $\{\cdot\}_k$ denotes the $k^{th}$ column of a matrix, $s_k^t$ is the amplitude of the $k^{th}$ said downlink signal, and $\mathcal{H}_t$ is a multiplexing spatio-temporal signature matrix composed of said transmit spatio-temporal signatures for said plurality of remote terminals and said common downlink channel and wherein said spatio-temporal multiplexing method utilizes said spatio-temporal multiplexing weights to produce said multiplexed downlink signals.

47. The wireless system as defined by claim 33 wherein said downlink signals and said uplink signals are transmitted on the same radio frequency and said transmit spatio-temporal processing means determines said transmit spatio-temporal multiplexing weights directly from the receive spatio-temporal demultiplexing weights.

48. The method as defined by claim 34 wherein said downlink signals and said uplink signals are transmitted on the same radio frequency and said transmit spatio-temporal processing step determines said transmit spatio-temporal multiplexing weights directly from the receive spatio-temporal demultiplexing weights.

49. The wireless system as defined by claim 33 wherein said system includes a transponder co-located with each remote terminal of said plurality of remote terminals and wherein said transmit spatio-temporal processing means determines said transmit spatio-temporal signatures using signals transponded from at least one of the transponders.

50. The method as defined by claim 34 wherein said system includes a transponder co-located with each remote terminal of said plurality of remote terminals, said method includes transponding signals received at least one of said remote terminals, and wherein said transmit spatio-temporal processing step determines said transmit spatio-temporal signatures using said transponded signals.

51. The wireless system as defined by claim 33 wherein each remote terminal in said plurality of remote terminals includes a transponder and wherein said transmit spatio-temporal processing means determines said transmit spatio-temporal signatures using signals transponded from at least one of the transponders.

52. The method as defined by claim 34 wherein each remote terminal in said plurality of remote terminals includes a transponder, said method includes transponding signals received at least one of said remote terminals, and wherein said transmit spatio-temporal processing step determines said transmit spatio-temporal signatures using said transponded signals.

53. The wireless system as defined by claim 33 wherein the location and directivity of said antenna elements are known, and wherein said transmit spatio-temporal processing means determines said transmit spatio-temporal signatures using the known location and directivity of said antenna elements and estimates of directions of arrival of said uplink signals from said plurality of remote terminals.

54. The wireless system as defined by claim 33 wherein the location and directivity of said antenna elements and location of said plurality of remote terminals are known, and wherein said transmit spatio-temporal processing means determines said transmit spatio-temporal signatures using the known location and directivity of said antenna elements and the known location of said plurality of remote terminals.

55. The method as defined by claim 34 wherein the location and directivity of said antenna elements and location of said plurality of remote terminals are known, and wherein said transmit spatio-temporal processing step determines said transmit spatio-temporal signatures using the known location and directivity of said antenna elements and the known location of said plurality of remote terminals.

56. The method as defined by claim 34 wherein the location and directivity of said antenna elements are known, and wherein said transmit spatio-temporal processing step determines said transmit spatio-temporal signatures using the known location and directivity of said antenna elements and estimates of directions of arrival of said uplink signals from said plurality of remote terminals.

57. The wireless system as defined by claim 33 wherein said downlink signals have predetermined modulation format parameters, and said transmit spatio-temporal processing means determines said transmit spatio-temporal signatures using signals transponded from at least one of the transponders.

58. The method as defined by claim 34 wherein said downlink signals have predetermined modulation format parameters, and said transmit spatio-temporal processing step determines said transmit spatio-temporal signatures using said transponded signals.

59. The wireless system as defined by claim 33 wherein said downlink signals have predetermined modulation format parameters, and said transmit spatio-temporal signatures are determined by the corresponding terminals in said plurality of remote terminals using the predetermined modulation format parameters of said downlink signals.

60. The wireless system as defined by claim 33 wherein said downlink signals and said uplink signals are transmitted on the same radio frequency and said transmit spatio-temporal processing means determines said transmit spatio-temporal signatures by calculating them directly from said receive spatio-temporal signatures.

61. The method as defined by claim 34 wherein said downlink signals and said uplink signals are transmitted on the same radio frequency and said transmit spatio-temporal processing step determines said transmit spatio-temporal signatures by calculating them directly from said receive spatio-temporal signatures.

62. A wireless system including at least one base station for transmitting to a plurality of remote terminals using a common downlink channel, said system comprising:

transmission means at said at least one base station including a plurality of transmit antenna elements and transmitters for transmitting multiplexed downlink signals to said plurality of remote terminals;

transmit spatio-temporal processing means for determining and storing transmit spatio-temporal signatures for said plurality of remote terminals; and spatio-temporal multiplexing means using said transmit spatio-temporal signatures and downlink signals to produce said multiplexed downlink signals, whereby said at least one base station can transmit said downlink signals to said plurality of remote terminals simultaneously on a common downlink channel.

63. In a wireless system including at least one base station, said at least one base station including a plurality of transmit antenna elements and transmitters, the method for transmitting to a plurality of remote terminals using a common downlink channel, said method comprising:

transmitting multiplexed downlink signals to said plurality of remote terminals using said transmitters at said at least one base station;

transmit spatio-temporal processing for determining and storing transmit spatio-temporal signatures for said plurality of remote terminals; and spatio-temporal multiplexing using said transmit spatio-temporal signatures and downlink signals to produce said multiplexed downlink signals.

64. The wireless system as defined by claim 62 wherein said common downlink channel is one of a plurality of downlink channels and wherein said transmit spatio-temporal processing means comprises:

a active remote terminal list comprising a list of remote terminals assigned to at least one of the channels of said plurality of downlink channels;

a spatio-temporal signature list comprising a transmit spatio-temporal signature for each remote terminal of said plurality of remote terminals and each channel of said plurality of downlink channels;

transmit spatio-temporal signature determining means for determining said transmit spatio-temporal signatures; and a transmit channel selector using said active remote terminal list and said spatio-temporal signature list to determine assignments of each remote terminal in said active remote terminal list to at least one of the channels of said plurality of downlink channels.

65. The method as defined by claim 63 wherein said common downlink channel is one of a plurality of downlink channels and wherein said transmit spatio-temporal processing step comprises:

forming a active remote terminal list comprising a list of remote terminals assigned to at least one of the channels of said plurality of downlink channels;

determining a transmit spatio-temporal signature for each remote terminal of said plurality of remote terminals and each channel of said plurality of downlink channels;

forming a spatio-temporal signature list comprising the transmit spatio-temporal signatures; and transmit channel selecting using said active remote terminal list and said spatio-temporal signature list to determine assignments of each remote terminal in said active remote terminal list to at least one of the channels of said plurality of downlink channels.

66. The wireless system as defined by claim 64 wherein said transmit spatio-temporal processing means further comprises:

a transmit spatio-temporal weight processor for calculating spatio-temporal multiplexing weights for each of the terminals in said active remote terminal list to which a downlink channel is assigned to at least one of the terminals in said active remote terminal list, said spatio-temporal multiplexing weights being utilized be said spatio-temporal multiplexing means to produce said multiplexed downlink signals.

67. the method as defined by claim 65 wherein said transmit spatio-temporal processing step further comprises:

transmit spatio-temporal weight processing for determining spatio-temporal multiplexing weights for each of the terminals in said active remote terminal list to which a downlink channel is assigned to at least one of the terminals in said active remote terminal list, said spatio-temporal multiplexing weights being utilized he said spatio-temporal multiplexing step to produce said multiplexed downlink signals.

68. The wireless system as defined by claim 62 wherein said at least one base station is one of a plurality of base stations, said common downlink channel is one of a plurality of downlink channels, each base station in said plurality of base stations having a transmit spatio-temporal processing means in said plurality of transmit spatio-temporal processing means, comprising:

an active remote terminal list comprising a list of remote terminals assigned to at least one of the channels of said plurality of downlink channels;

a spatio-temporal signature list comprising a transmit spatio-temporal signature for each remote terminal of said plurality of remote terminals and each channel of said plurality of downlink channels;

transmit spatio-temporal signature determining means for determining said transmit spatio-temporal signatures; and a transmit spatio-temporal weight processor for calculating spatio-temporal multiplexing weights for each of the terminals in said active remote terminal list to which a downlink channel is assigned and each channel of said plurality of downlink channels assigned to at least one of the terminals in said active remote terminal list, said spatio-temporal multiplexing weights being utilized by said spatio-temporal multiplexing means to produce said multiplexed downlink signals, said system further comprising:

joint channel selector means for jointly determining assignments of each remote terminal in said active remote terminal list to at least one of the channels of said plurality of downlink channels and to at least one of the base stations of said plurality of base stations; and communications means for communicating said assignments between each base station in said plurality of base stations and said joint channel selector means.

69. The method as defined by claim 63 wherein said at least one base station is one of a plurality of base stations, said common downlink channel is one of a plurality of downlink channels, each base station in said plurality of base stations carrying out said transmit spatio-temporal processing step, said transmit spatio-temporal processing step comprising:

forming an active remote terminal list comprising a list of remote terminals assigned to at least one of the channels of said plurality of downlink channels, determining a transmit spatio-temporal signature for each remote terminal of said plurality of remote terminals and each channel of said plurality of downlink channels;

forming a spatio-temporal signature list comprising the transmit spatio-temporal signatures;

transmit spatio-temporal weight processing for determining spatio-temporal multiplexing weights for each of the terminals in said active remote terminal list to which a downlink channel is assigned and each channel of said plurality of downlink channels assigned to at least one of the terminals in said active remote terminal list, said spatio-temporal multiplexing weights being utilized by said spatio-temporal multiplexing step to produce said multiplexed downlink signals;

joint channel selecting for jointly determining assignments of each remote terminal in said active remote terminal list to at least one of the channels of said plurality of downlink channels and to at least one of the base stations of said plurality of base stations; and communicating said determined assignments between each base station in said plurality of base stations.

70. The wireless system as defined by claim 62 wherein said spatio-temporal multiplexing means determines spatio-temporal multiplexing weight vectors for said common downlink channel as the columns of a matrix $W_{tx}$ as follows:

$$\{W_{tx}\}_k = s_k^{t^i}\{\mathcal{H}_t \mathcal{H}_t^* \mathcal{H}_t\}^{-1}_{mL_t(k-1)+1} k=1,\ldots,n_t,$$

where $(\cdot)^*$ denotes the complex conjugate transpose of a matrix, $(\cdot)^{-1}$ denotes the inverse of a matrix, $\{\cdot\}_k$ denotes the $k^{th}$ column of a matrix, $s_k^t$ is the amplitude of the $k^{th}$ said downlink signal, and $\mathcal{H}_t$ is a multiplexing spatio-temporal signature matrix composed of said transmit spatio-temporal signatures for said plurality of remote terminals and said common downlink channel and said spatio-temporal multiplexing means utilizes said spatio-temporal multiplexing weights to produce said multiplexed downlink signals.

71. The method as defined by claim 63 wherein said spatio-temporal multiplexing step determines spatio-temporal multiplexing weight vectors for said common downlink channel as the columns of a matrix $W_{tx}$ as follows:

$$\{W_{tx}\}_k = s_k^{t^i}\{\mathcal{H}_t \mathcal{H}_t^* \mathcal{H}_t\}^{-1}_{mL_t(k-1)+1} k=1,\ldots,n_t,$$

where $(\cdot)^*$ denotes the complex conjugate transpose of a mathrix, $(\cdot)^{-1}$ denotes the inverse of a matrix, $\{\cdot\}_k$ denotes the $k^{th}$ column of a matrix, $s_k^t$ is the amplitude of the $k^{th}$ said downlink signal, and $\mathcal{H}_t$ is a multiplexing spatio-temporal signature matrix composed of said transmit spatio-temporal signatures for said plurality of remote terninals and said common downlink channel and said spatio-temporal multiplexing method utilizes said spatio-temporal multiplexing weights to produce said multiplexed downlink signals.

72. The wireless system as defined by claim 62 wherein said system includes a transponder co-located with each remote terminal of said plurality of remote terminals and wherein said transmit spatio-temporal processing means determines said transmit spatio-temporal signatures using signals transponded from at least one of the transponders.

73. The method as defined by claim 63 wherein said system includes a transponder co-located with each remote terminal of said plurality of remote terminals, said method includes transponding the signals received at at least one remote terminal, and wherein said transmit spatio-temporal processing step determines said transmit spatio-temporal signatures using the transponded signals.

74. The wireless system as defined by claim 62 wherein each remote terminal in said plurality of remote terminals includes a transponder, and wherein said transmit spatio-temporal processing means determines said transmit spatio-temporal signatures using signals transponded from at least one of the transponders.

75. The method as defined by claim 63 wherein each remote terminal in said plurality of remote terminals includes a transponder, said method includes transponding the signals received at at least one remote terminal, and wherein said transmit spatio-temporal processing step determines said transmit spatio-temporal signatures using the transponded signals.

76. The wireless system as defined by claim 62 wherein said downlink signals have predetermined modulation format parameters, and said transmit spatio-temporal processing means determines said transmit spatio-temporal signatures using signals transponded from at least one of the transponders.

77. The method as defined by claim 63 wherein said downlink signals have predetermined modulation format parameters, and said transmit spatio-temporal processing step determines said transmit spatio-temporal signatures using the transmitted signals.

78. The wireless system as defined by claim 62 wherein said downlink signals have predetermined modulation format parameters, and said transmit spatio-temporal signatures are determined by the corresponding terminals in said plurality of remote terminals using the predetermined modulation format parameters of said downlink signals.

79. The wireless system as defined by claim 62 wherein the location and directivity of said antenna elements and the location of said plurality of remote terminals are known, and wherein said transmit spatio-temporal processing means determines said transmit spatio-temporal signatures using the known location and directivity of said antenna elements and the known location of said plurality of remote terminals.

80. The method as defined by claim 63 wherein the location and directivity of said antenna elements and the location of said plurality of remote terminals are known, and wherein said transmit spatio-temporal processing step determines said transmit spatio-temporal signatures using the known location and directivity of said antenna elements and the known location of said plurality of remote terminals.

* * * * *